US009550111B2

(12) United States Patent
Perry

(10) Patent No.: US 9,550,111 B2
(45) Date of Patent: Jan. 24, 2017

(54) SYSTEMS AND METHODS FOR GENERATING AND SHARING VIDEO CLIPS OF CLOUD-PROVISIONED GAMES

(71) Applicant: Sony Computer Entertainment America LLC, San Mateo, CA (US)

(72) Inventor: David Perry, Monarch Beach, CA (US)

(73) Assignee: Sony Interactive Entertainment America LLC, San Mateo, CA (US)

(*) Notice: Subject to any disclaimer, the term of this patent is extended or adjusted under 35 U.S.C. 154(b) by 242 days.

(21) Appl. No.: 14/140,402

(22) Filed: Dec. 24, 2013

(65) Prior Publication Data

US 2014/0187323 A1    Jul. 3, 2014

Related U.S. Application Data

(63) Continuation of application No. 13/797,894, filed on Mar. 12, 2013, now Pat. No. 8,834,277.

(Continued)

(51) Int. Cl.
*A63F 9/24* (2006.01)
*A63F 13/30* (2014.01)
(Continued)

(52) U.S. Cl.
CPC .............. *A63F 13/12* (2013.01); *A63F 13/06* (2013.01); *A63F 13/10* (2013.01);
(Continued)

(58) Field of Classification Search
None
See application file for complete search history.

(56) References Cited

U.S. PATENT DOCUMENTS 8,475,269 B2   7/2013  Okada
2006/0287029 A1  12/2006  Yoshinobu et al.
(Continued)

FOREIGN PATENT DOCUMENTS

JP    2012065831 A1    4/2012

OTHER PUBLICATIONS

Dean Takahasi, Applifier launches video ad network to monetize Facebook games, Jul. 18, 2012, http://venturebeat.com/2012/07/18/applifier-launches-video-ad-network-to-monetize-facebook-games/.

(Continued)

*Primary Examiner* — Jason Yen
(74) *Attorney, Agent, or Firm* — Martine Penilla Group, LLP

(57) ABSTRACT

Apparatus, systems and methods for providing inputs to a game executing on a game server, is disclosed. A controller includes a circuit, a plurality of input controls interfaced with the circuit of the controller for producing controller data, and a communication circuit for connecting the controller with an internet access device. The communication circuit is configured to exchange controller data with a game server. The exchange of the controller data occurs without a communication link between the controller and a local game console. The game server is configured to execute a game play of a video game and drive interactivity of the video game using the controller data. The game server is remote from the local game console. The game server transmits a video feed of the game play to the game console.

12 Claims, 15 Drawing Sheets

Related U.S. Application Data

(60) Provisional application No. 61/746,478, filed on Dec. 27, 2012.

(51) Int. Cl.
*A63F 13/20* (2014.01)
*A63F 13/40* (2014.01)

(52) U.S. Cl.
CPC ... *A63F 2300/556* (2013.01); *A63F 2300/577* (2013.01); *A63F 2300/6018* (2013.01); *A63F 2300/6036* (2013.01)

(56) References Cited

U.S. PATENT DOCUMENTS

| | | | | |
|---|---|---|---|---|
| 2007/0155507 A1* | 7/2007 | Gatto | ............ | A63F 13/12 463/42 |
| 2008/0004115 A1 | 1/2008 | Chatani | | |
| 2008/0076546 A1 | 3/2008 | Moyle et al. | | |
| 2008/0139301 A1 | 6/2008 | Holthe | | |
| 2009/0099928 A1 | 4/2009 | Vasile | | |
| 2009/0131177 A1 | 5/2009 | Pearce | | |
| 2009/0253507 A1 | 10/2009 | Ishii et al. | | |
| 2009/0325694 A1* | 12/2009 | Beckman | ............ | A63F 13/10 463/31 |
| 2011/0201414 A1 | 8/2011 | Barclay et al. | | |
| 2011/0237324 A1* | 9/2011 | Clavin | ............ | G06K 9/00369 463/29 |
| 2011/0281645 A1 | 11/2011 | Wolfson et al. | | |
| 2011/0312424 A1 | 12/2011 | Burckart et al. | | |
| 2011/0320019 A1 | 12/2011 | Lanciani et al. | | |
| 2012/0004042 A1 | 1/2012 | Perry et al. | | |
| 2012/0108306 A1 | 5/2012 | Munsell et al. | | |
| 2012/0150950 A1* | 6/2012 | Osann, Jr. | ............ | H04N 21/4122 709/203 |
| 2012/0165100 A1* | 6/2012 | Lalancette | ............ | A63F 13/10 463/42 |
| 2013/0137511 A1* | 5/2013 | Bae | ............ | G07F 17/3225 463/29 |
| 2013/0172086 A1 | 7/2013 | Ikenaga | | |
| 2013/0190081 A1 | 7/2013 | Naik et al. | | |
| 2013/0244789 A1 | 9/2013 | Gary | | |
| 2013/0324099 A1* | 12/2013 | Dgani | ............ | C08L 97/02 455/418 |
| 2013/0332510 A1* | 12/2013 | Pritchett | ............ | G06F 9/5072 709/203 |
| 2014/0038721 A1 | 2/2014 | Archer et al. | | |
| 2014/0094314 A1 | 4/2014 | Watson et al. | | |
| 2014/0155171 A1 | 6/2014 | Laakkonen et al. | | |

OTHER PUBLICATIONS

Everplay.com, Everplay, Oct. 5, 1012, https://everplay.com/.
Everplay.com, Introducing Everplay—record & share game replays, Aug. 20, 2012, htttps://www.youtube.com/watch?v=InL1iZ-FBH0.

* cited by examiner

SYSTEMS AND METHODS FOR GENERATING AND SHARING VIDEO CLIPS OF CLOUD-PROVISIONED GAMES

CLAIM OF PRIORITY

This application is a continuation application under 35 U.S.C. 120 and claims priority from co-pending U.S. application Ser. No. 13/797,894, filed on Mar. 12, 2013, and entitled, "Systems and Methods for Sharing Cloud-Executed Mini-Games Challenging Friends and Enabling Crowd Source Rating," which claims priority under 35 U.S.C. 119(e), to U.S. Provisional Patent Application No. 61/746,478, filed on Dec. 27, 2012, and entitled "Systems and Methods for Sharing Cloud-Executed Mini-Games, Challenging Friends and Enabling Crowd Source Rating," the disclosure of each of which are herein incorporated by reference in its entirety.

BACKGROUND

1. Field of the Invention

The present invention relates to systems and methods for defining, sharing and playing mini-games in a cloud executed system.

2. Description of the Related Art

Cloud systems deliver services over a network (typically the Internet) using computing resources (hardware and software). The services, in the context of gaming, enable streaming of content to remote clients, wherein most processing is done on servers, which may be distributed. Input provided at the remote clients will in turn drive execution of the game on the servers, without the need for dedicated gaming hardware at the client's location. Due to the ease of accessing the games executing on the cloud systems, cloud gaming has been increasing in popularity because users find it easier to access more titles without complex hardware restrictions. Similarly, game suppliers find it easier to manage game code from centralized locations.

It is in this context that embodiments of the invention arise.

SUMMARY

Embodiments of the present invention relate to systems and methods for managing execution and sharing of mini-games in a game cloud executed system, and in particular to the sharing of particular video clips and mini-games with other users. Several inventive embodiments of the present invention are described below.

In one embodiment, a controller is disclosed. The controller includes a circuit, a plurality of input controls interfaced with the circuit of the controller for producing controller data and a communication circuit for connecting the controller with an internet access device. The communication circuit is configured to exchange controller data with a game server through the internet access device. The exchange of the controller data occurs without a communication link between the controller and a local game console. The game server is configured to execute a game play of a video game and drive interactivity of the video game using the controller data. The game server is remote from the local game console. The game server transmits a video feed of the game play to the local game console.

In one embodiment, the local game console includes a display for rendering the video feed of the game play received from the game server.

In one embodiment, the controller data produced by the input controls include button inputs, joystick inputs, embedded motion detection inputs, audio inputs, or combinations of any two or more thereof.

In one embodiment, the internet access device is communicatively connected to the game server over a network.

In one embodiment, the controller data used for driving game interactivity includes position data defined by coordinates, motion data, inertia data, direction data, or any two or more combinations thereof.

In one embodiment, the controller is connected to the internet access device through a wireless connection.

In one embodiment, a processor within the local game console is configured to communicatively connect to the internet access device to receive the video feed, process the video feed and render the video feed on a display of the local game console.

In one embodiment, a controller is disclosed. The controller includes logic for connecting the controller to an internet access device. The controller is configured to exchange controller data to and from a game server via the internet access device, without communicating with a game console. The controller is configured to control interfacing with a game interface and games provided via the game server. The game server is configured to receive the controller data and drive interactivity of a game selected for execution on the game server.

In one embodiment, the game server provides a video feed to a display of the game console for rendering. The controller data directs a state of the video feed provided at the display, in response to communication with the game server via the internet access device.

In one embodiment, a method for providing inputs to a game executing on a game server, is disclosed. The method includes exchanging controller data for the game executing on the game server via an internet access device. The controller data acts to drive interactivity of the game executing on the game server. The exchange of controller data between the game server and a controller occurs without going through a local game console. The game server is configured to execute the game play of the game and transmit a video feed of the game play to the local game console for rendering. The controller data directs a state of the video feed rendered at the display in response to communication with the game server via the internet access device.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

Figure 1A:
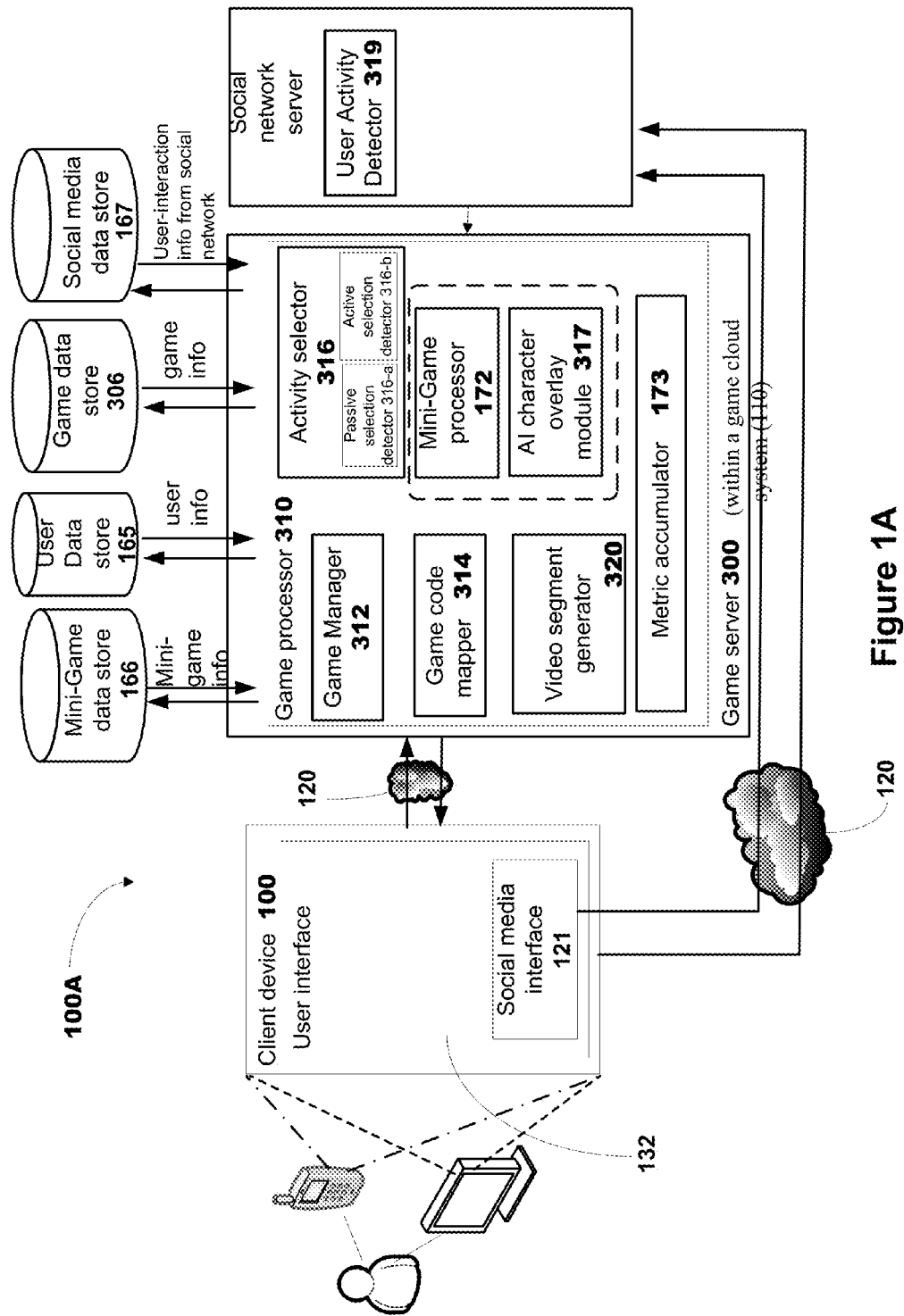
FIG. 1A illustrates a simplified block diagram of a generic system used for managing execution and sharing of video games and mini-games over a game cloud system, in accordance with an embodiment of the invention.

The following embodiments describe systems and methods for managing execution and sharing of mini-games over a game cloud-based system. The management of the mini-games includes, but is not limited to, classifying, ranking, and sharing mini-game in posts within a network, based on user interactions at the mini-games. In one embodiment, during the sharing of particular mini-games, users are provided with functionality to enable challenging of other users for posted mini-games. The challenges are saved and displayed to other users, while also enabling the viewing users to play the mini-games and participate in the challenge or challenges.

In one embodiment, as described in greater detail below, the mini-games to be shared are custom defined by users. The creation of mini-games, in one embodiment, begins by allowing users to play a full game, which they have access to play from an online database.

The game play, in one embodiment, is through a cloud based processing system that enables streaming of online game play, while allowing users to provide interactive input from remote locations that are connected to the internet. While the users play the game, a video recording of the game is created, capturing the game play activity from the game play session. In one embodiment, a user is allowed to select a portion of the video recording. The selection of the portion of the video recording is used, in one embodiment, to define the mini-game that is to be created. The user defined mini-game will therefore be a segment or part of the full game, with a defined start and end point as defined by the user. In one embodiment, the segment may have all of the features of the full game. In other embodiments, the segment may have less features, objects, controls, etc., than the full game. In one embodiment, the user defines the start and end points by selecting the start and end points in the video recording.

The result is a custom selected section of the full game, defined as an executable mini-game. As the mini-game was defined from the video recording, the mini-game may also be provided with an accompanying video recording portion, or clip. In one embodiment, as more users create mini-games, it is possible that many different mini-games can be created from the same full game title, with each mini-game having different start and end points.

Because the mini-games have customization associated with the user that created the mini-game, users may have a desire to share the mini-games with others. For example, the portion of the video recording that is associated with each mini-game will show the game play of the user that created the mini-game. The game play may show, for example, the accomplishments by the user, such as particular game scores, awards, etc.

In one embodiment, the mini-games can be shared via a game network, where users of the game network can post their created mini-games. In another embodiment, users can post links to the mini-games on one or more social networks. As a result of the sharing, other users in the game network or social network will be allowed access to the mini-games. In one embodiment, the mini-game will include two parts; one part is the video portion showing the game play of the user that created the mini-game, and a second part is an executable portion of the mini-game that parallels the section of the full game that was used to create the mini-game. In addition to the video portion and the executable portion, the mini-games may also include challenge comment provided by the user that created the mini-game.

During the sharing process, therefore, users will be allowed to view the portion of the video recording of the mini-game and also play the mini-game posted by the creator. During the viewing of the video recording portion or at any time during the mini-game access the users can opt to play the executable portion of the mini-game. The game plays of the mini-game are used to generate mini-game play videos. The mini-game play videos capture the user activities of the one or more users during their respective game play and may include challenge responses to the challenge comment provided within the post of the mini-game. In one embodiment, the challenge response may be a response to an original challenge comment issued by the user that posted the mini-game for sharing or may be a response to other users' challenge response. The challenge response may be in the form of comments, text, additional postings, additional videos, links to additional videos, images or other annotations. In some embodiments, the rate at which mini-games are shared, viewed, played, commented on, etc., can be used to provide higher ratings to the mini-games and to the creator/other users. In one embodiment, higher rated mini-games will be provided with higher prominence on game websites. In other embodiments, mini-games that are highly rated can provide rewards to the posting user. This, in turn, may provide for a built-in mechanism to encourage better quality posting of mini-games. Along similar lines, mini-games created by higher rated users may be preferred over other users when rendering a recommended list of mini-games at the website when a user accesses the game cloud system.

In one embodiment, user interactions with a mini-game may include challenge response and social network content associated with the mini-game. The social network content of the mini-game may include the number of times the mini-game is shared, the number of times the mini-game is viewed, the number of times the mini-game is played, the number of recommendations for the mini-game, the number of comments entered for the mini-game, the number of users that responded to the challenge comment, the number of created mini-game play videos, the rate at which mini-games are shared, the quality of the mini-game play videos generated by other users, the number of plays by highly rated players, etc.

Each classified and ranked mini-game may be displayed based on the classifying categories in the forms of mini-game symbols (e.g., mini-game icons). In some embodiments, in addition to the mini-game symbols, an initial image that is most representative of content of the video recording of the mini-game may be identified and associated with the mini-game when displayed. Additionally, the mini-games in each category may be organized based on popularity, chronologically or any other pre-defined format. In some embodiments, the ratings of the different mini-games are computed based on the social network content and this rating is used for sorting the mini-games and for rendering these ratings alongside the selected ones of the mini-games returned for rendering. Similarly, the social network content may also be used to rate the users and computer user status of the different users. Using the rating and status of the different users, mini-games are selected for rendering on the game website. When a mouse is hovered over a mini-game symbol, some of the video frames of the mini-game represented by the mini-game symbol will be automatically played. Further examples and embodiments will now be described below with reference to the exemplary drawings.

It will be obvious, however, to one skilled in the art, that the present invention may be practiced without some or all of these specific details. In other instances, well known process operations have not been described in detail in order not to unnecessarily obscure the present invention.

With the above general understanding of the various embodiments, example details of the embodiments will now be described with reference to the various drawings. FIG. 1A illustrates a simplified block diagram of a game server system 100A used for managing execution and sharing of mini-games within a game cloud system 110, in accordance with an embodiment of the invention. In some embodiments, the game cloud system may include a plurality of virtual machines (VMs) running on a hypervisor of a host machine (or simply a host), with one or more virtual machines configured to execute a game processor module utilizing the hardware resources available to the hypervisor of the host. A game processor module 310 is configured for managing execution and sharing of mini-games within the game cloud system 110. As shown, the system 100A includes a game server 300 executing the game processor module 310 that provides access to a plurality of interactive video games and associated mini-games and a game client 100 for requesting access to games/mini-games over a network 120, such as the Internet, and for rendering the games/mini-games returned by the game server 300 on a display device 132. It should be noted that the game client 100 is any type of computing device having at least a memory and a processor module that is capable of connecting to the game server 300 over the network 120 and for interacting with the game server to execute a rendered portion of the video game/mini-game. Some examples of game client device include a personal computer (PC), home theater PC, general purpose computer, mobile computing device, or any other types of computing devices that can interact with the game server to execute a video game. The game server may be any type of server computing device available in the cloud, including a virtual machine executing on a host, and accessed remotely through the network 120.

The game client (or simply "the client") requests access to the games through a user interface provided on a display 132 of the client 100. In some embodiments, the user interface may include a user authentication module to validate a user before servicing a request for providing access to the games from the game network. In response to the request, the game server identifies a plurality of video games, populates a graphical user interface (GUI) with the identified set of plurality of video games and returns the user interface to a client for rendering at the display 132. Each video game may include an initial image associated with it that is representative of the video game. The GUI is populated with the identified video games, initial images associated with each of the identified video games and returned to the client device for rendering. Each game may be associated with a plurality of mini-games. In some embodiments, the mini-games are defined by users. Further, each game may be associated with a primary video segment. The primary video segment may be a result of game play of the video game by a user within the game cloud system or a social network. The primary video segment is associated with the video game within the game cloud system and is available for sharing.

In some embodiments, each user defined mini-game within a video game may include a trigger event, a task to be performed, a sequence of steps or moves, or a challenge to be handled or overcome. In one embodiment, each mini-game defined represents a pre-selected portion of the associated game that is less than an entire part of the game. In one embodiment, each video game may be associated with one or more mini-games and each mini-game of the video game may be associated with a mini-game play video. In another embodiment, some of the video games may include one or more mini-games and other games may not have any mini-games associated with it. In one embodiment, the GUI generated with the video games, in response to the request from the client, may provide indicators (not shown) to identify which of the video games have one or more mini-games associated with it and which of the video games have no mini-games associated with it. The generated GUI of video games is rendered at the display 132 of the client device 100. The display 132 may be any type of display that is capable of visually rendering the GUI interface identifying video games (or simply "games") and includes such devices as a monitor or television utilizing any of various types of display technologies, such as LCD, plasma, and DLP technologies. Though not specifically shown, the display 132 may also utilize a projector which projects a GUI image onto a display screen, wall, or other flat or other surface for viewing.

User activity at the GUI is monitored and analyzed to determine type of activity detected at the GUI. When a passive selection activity is detected proximate to an image of one of the plurality of video games, a primary video segment of the particular video game is identified for rendering at the display 132 of the client device. Active selection activity, such as one or more mouse clicks, touch, voice, gesture, one or more taps, input through a game controller, etc., at the video game may be detected either during the rendering of the primary video segment or at an initial image of the video game rendered on the GUI. The active selection activity triggers a selection event that results in an instance of the executable code of the video game to be loaded to the game cloud system enabling play of the selected video game at the client device 100. The loading of the executable code also includes detecting type of client device associated with a user providing the selection activities, and/or type of controller available for the user to provide input to the video game.

When a user logs in to the cloud game network, the user may be presented with an option to designate the type of client device through which the user is accessing the cloud game network. In one embodiment, a series of client device options are presented from which the user may select one corresponding to his/her client device. Similarly, the user may also be presented with an option to designate the type of controller device they will use to play a video game. In one embodiment, a series of controller options can be presented to the user, from which the user may select to designate a controller type corresponding to their controller hardware. In other embodiments, the cloud game network can be configured to automatically detect the client device type and/or the controller device type.

For example, at the time of login, the client device may send information to the game server identifying itself as well as a connected controller device (e.g. in response to a request from the game server). Based on this information, the game server within the game cloud system may determine an appropriate video game output configuration and input parameter configuration to provide a gaming experience optimized for the user's client device and controller device. In one embodiment, a look-up table is employed to determine video game configuration and input parameter configuration based on a detected client device and a detected controller device. These configuration and input parameters are used to generate the pre-defined setup parameters. The setup parameters provide information at the client device to define controls for playing the video game. In addition to the setup parameters, a social media interface 121 may also be provided at the client device to enable social interaction with other users.

To assist in the managing execution and sharing of the mini-games at the game server 300, a game processor module 310 is provided. The game processor module is configured to execute on the game server 300 and includes a plurality of modules that interact with one another, with one or more data stores and with the client device. Some of the modules within the game processor 310 include a game manager module 312, a game code mapper 314, an activity selector 316 including a passive selection detector 316-a and active selection detector 316-b, a mini-game processor 172, a video segment generator 320 and a metric accumulator 173. In addition to the above list of modules, an AI character overlay module 317 may also be included within the game processor 310. In some embodiments, the AI character overlay module 317 may be part of the mini-game processor 172. The above list of modules is exemplary and should not be considered restrictive. Fewer or additional modules may be provided in the game processor module 310 for managing execution and sharing of mini-games, in various embodiments of the invention. The Game cloud system 110 may further include a plurality of generic gaming data storage systems for storing user and game-related data and to provide such data to the various modules executing on the game server 300. Some of the exemplary data storage systems include mini-game data store 166, user data store 165, game data store 306 and social media data store 167, as illustrated in FIG. 1A, to store various processing data. Mini-game data store 166 is used to store and retrieve data related to mini-games. User data store 165 is used to store and retrieve user data, including user authentication data. Game data store 306 is used to store and retrieve video game related data. Social media data store 167 is used to store and retrieve user-interaction data from social network.

Figure 1B:
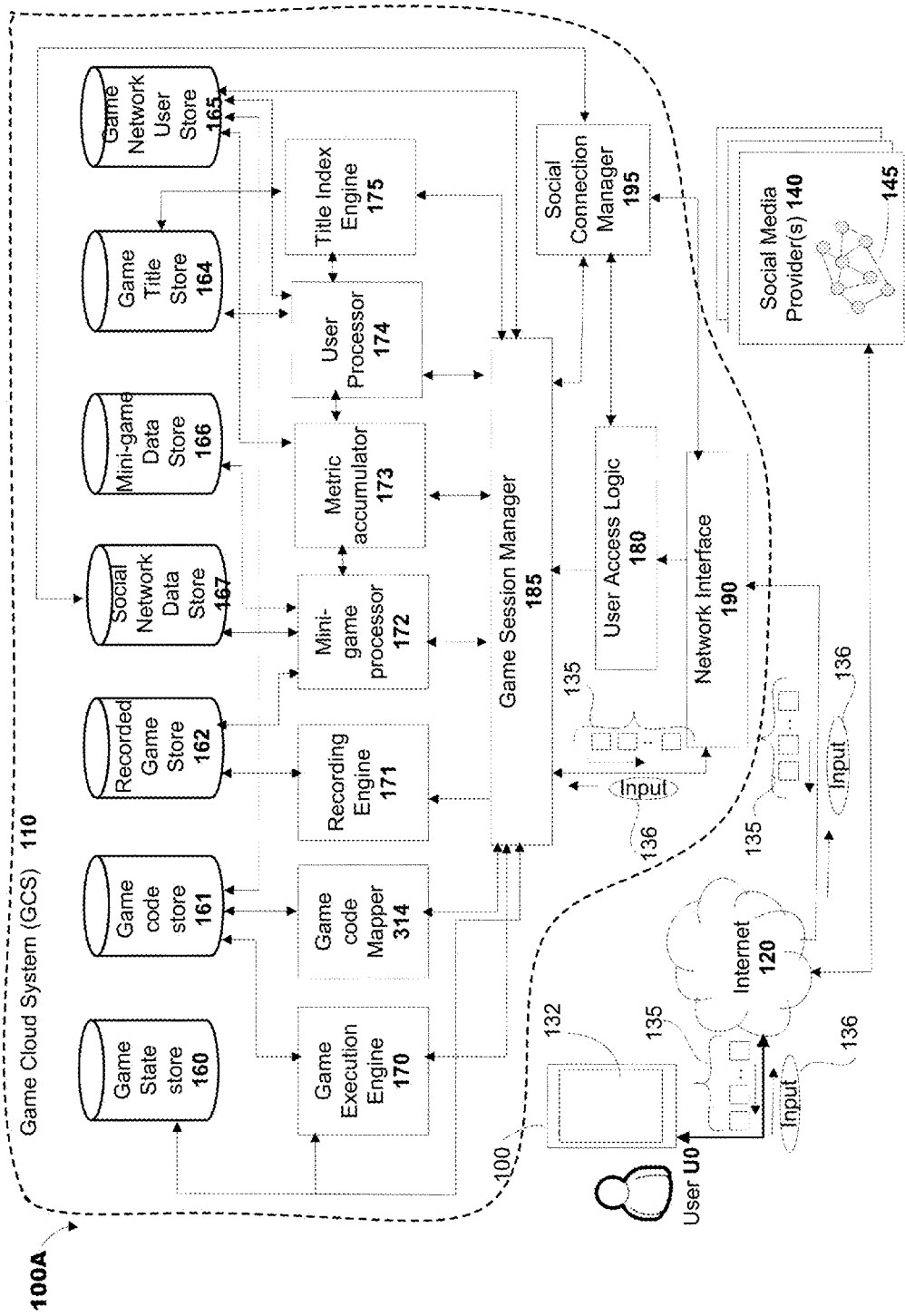
FIG. 1B illustrates a detailed block diagram of the generic system illustrated in FIG. 1A identifying various modules used for accessing, playing, and sharing of video games and mini-games stored in a game cloud system, in accordance with an embodiment of the invention.

The role of the various modules will be described in detail with reference to FIG. 1B. FIG. 1B illustrates a system diagram 100A identifying various modules and their interactions with one another and with the client/social media providers for enabling access and playing of video games stored in a game cloud system (GCS) 110, in accordance with an embodiment of the invention. Referring simultaneously to FIGS. 1A and 1B, system 100A includes a GCS 110, one or more social media providers 140, and a user device 100, all of which are connected via Internet 120. Although one user device 100 is illustrated in system diagram 100A in FIG. 1B, it is to be understood that in practice, many more user devices may be connected to Internet 120 to access the services provided by GCS 110 and social media providers 140. Some exemplary user devices are illustrated in FIG. 1A.

In one embodiment, game cloud system 110 includes a plurality of modules that receive and process various data related to managing execution and sharing of mini-games. In one embodiment, the different modules of the GCS 110 may include one or more execution engines that execute on a game server using data available to the game server. For example, a game execution engine 170, a user processor module 174, a title index engine 175, a user access logic module 180, and game session manager module 185 may be part of the game manager module 312 illustrated in FIG. 1A. A recording engine 171 may be part of a video segment generator module 320. In addition to the above listed execution engines, additional modules/execution engines may also be available, such as a mini-game processor module 172, a network interface 190, a metric accumulator 173 and a social connection manager 195.

Game cloud system 110 may further include a plurality of data storage systems to store various processing data. A generic list of data storage systems was illustrated in FIG. 1A. The various gaming data storage systems of FIG. 1A may include one or more specific data storage systems. An exemplary list of specific data storage systems illustrated in FIG. 1B include a game state store 160, a game code store 161, a recorded game store 162, a game title store 164, a game network user store 165, a mini-game data store 166, and a social network data store 167. The mini-game data store 166 of FIG. 1B is similar to the mini-game data store of FIG. 1A and is therefore referenced using the same reference numeral. The game network user store of FIG. 1B is similar to user data store 165 of FIG. 1A and is therefore referenced using the same reference numeral 165. The game state store 160, game code store 161, recorded game store 162 and game title store 164 of FIG. 1B may be part of the game data store 306 of FIG. 1A. The social network data store of FIG. 1B is similar to the social media data store 167 of FIG. 1A and is therefore referenced using the same reference numeral 167.

In one embodiment, game cloud system 110 is a system that can provide game applications, services, gaming related digital content, and interconnectivity among systems, applications, users, and social networks. Game cloud system 110 may communicate with user device 100 (i.e., client device 100) and social media providers 140 via network interface 190 that will enable wired and wireless communication methods. In one embodiment, each social media provider 140 includes at least one social graph 145 that shows social network user interconnections.

In one embodiment, a social media provider 140 can be the game cloud system 110 itself, whereby user relationships are managed without the need for external social media providers 140. In still other embodiments, the system can operate as a hybrid system, wherein social relationships are managed using social graph data from third party social media providers (via application programming interface (API) accesses or the like) and user relationships with other users, as defined by the game cloud system.

In one embodiment, a user, e.g., user U0, can access the services provided by game cloud system 110 and social media providers 140 by way of user device 100. User device 100 can include any type of device having a processor and memory, wired or wireless, portable or not portable. User device 100, which is shown connected to Internet 120, includes a display 132 that can be a touchscreen, or a display typically provided by a flat-panel display, a cathode ray tube (CRT), or other device capable of rendering a display. Alternately, user device 100 can have its display 132 separate from the device, similar to a desktop computer or a laptop computer. In one embodiment, user device 100 can be in the form of a smartphone, a tablet computer, or hybrids that provide touch screen capability in a portable form factor. One exemplary device can include a portable phone device that runs an operating system and is provided with access to various applications (apps) that may be obtained over Internet 120, and executed on the local portable device (e.g., smartphone, tablet, laptop, desktop, etc.).

In one embodiment, user device 100 can install an application that enables executions and views of the games stored and shared by the game cloud system 110. Further, user device 100 can be used to communicate with one or more social media provider(s) 140 via Internet 120 such that user device 100 may be used to execute a game play or view video recordings of the game plays shared by one or more social media providers 140. For example, user U0 may access a game posted in one of social media providers 140 by selecting a link on a page, stream, news-feed, or post of the social media provider, and then playing or viewing the game from user device 100.

In one embodiment, the games posted and shared in social media providers 140 are mini-games generated based on video recordings of game plays of available game titles. The mini-games may be stored in recorded game store 162 of game cloud system 110. While user U0 is executing or viewing a game or mini-game stored in game cloud system 110, user device 100 is capable of receiving game video frames 135 from game cloud system 110 and transmitting user interactive input 136 (simply "input") to game cloud system 110. The received game video frames 135 can be shown in display 132 of user device 100.

In one embodiment, a user, e.g., user U0, may create a user account and register the created user account with game cloud system 110. After the user account is registered with game cloud system 110, game cloud system 110 may provide a user ID to this registered user account and save the user ID in a user profile associated with the registered user account. The user profile associated with a user account will be described in more detail with reference to FIG. 1D. In one embodiment, the user profile associated with a user account may be saved in a user database in game network user store 165.

In one embodiment, user access logic 180 may be used to detect all accesses made by user U0, either through user device 100 or other suitable devices, and be used to verify the user log-in information (e.g., the name and password for the user account of user U0). After user U0 logs into his or her user account, user access logic 180 may communicate the user login information with user processor 174 that in turn updates the user login information stored in the user profile. Further, user access logic 180 may communicate the user login information with social connection manager 195, so that social connection manager 195 can pull the names of the user's social network friends/contacts from one or more social media providers 140 via network interface 190. The names of the user's social network friends/contacts may be received by social connection manager 195, which in turn transmits the received information to game network user store 165 to be saved in the user profile of user U0.

After logging in, the user can access services provided by game cloud system 110 via game session manager 185. For example, game session manager 185 may inform user processor 174 of the user login information so that user processor 174 may record or update the user login information in the user profile associated with this user. In one embodiment, the user profile is stored in game network user store 165. User processor 174 may also communicate with title index engine 175 to identify game titles associated with the user account. The game titles associated with the user account may be previously purchased by the user, previously played by the user and/or free game titles identified and made available by the game providers. In one embodiment, the game titles associated with the user account may also include game titles associated with a genre defined by the user's interest based on user's prior selection of games. In this example, available game titles may therefore be stored in game title store 164.

In one embodiment, after a user chooses an available game title to play, a game session for the chosen game title may be initiated by the user through game session manager 185. Game session manager 185 first accesses game state store 160 to retrieve the saved game state of the last session played by the user (for the selected game), if any, so that the user can restart the game play from a previous game play stop point. Once the resume or start point is identified, the game session manager 185 may inform game execution engine 170 to execute the game code of the chosen game title stored in game code store 161. After a game session is initiated, game session manager 185 may pass the game video frames 135 (i.e., streaming video data), via network interface 190 to a user device, e.g., user device 100.

During game play, game session manager 185 may communicate with game execution engine 170, and recording engine 171, to generate or save a recording (e.g., video) of the game play or game play session as the game play processes. In one embodiment, the video recording of the game play can include other game related metadata provided and/or captured during game play. The video recording of game play may be saved in recorded game store 162. The metadata may be saved in game state store 160.

In one embodiment, a mini-game may be created using information from the video recording of the game play, e.g., via mini-game processor 172. For example, after a user plays a game and the video recording is created, the user can simply watch a replay of the video recording of his or her prior game play. When the user is watching a replay of the video recording, the user may find one or more parts to be particularly interesting. For example, the user may have achieved a high score or completed an interesting task during the game play. The user, in one embodiment, is provided with controls to select a portion of the video recording, which will then be used by mini-game processor 172 to construct a mini-game based on the selected portion of the video. In one embodiment, the mini-game will include the executable code necessary to render the functionality or part of the functionality that was used to create the content of the selected portion of the video recording.

Thus, a user wishing to play the mini-game will be provided with a substantially similar game play experience as the user that originally played the game that created the video recording. In one embodiment, the mini-game will inherit the game parameters used for playing the game. For instance, if the original game play included a scene where the user is riding a bike over a jump, and the user selects that portion from the video recording of his game play, the new mini-game would include code to enable similar or substantially similar game play. In this instance, the color of the bike, the character used for riding the bike, etc., may be inherited from the original game. That is, the mini-game would enable the user or other users to play the mini-game, wherein game play would include riding a bike over a jump. In this case, the user playing the mini-game may or may not achieve the same game score for the jump.

The portion of the video recording associated with the created mini-game may be saved in recorded game store 162 and remaining portion of the video recording may be erased after a defined time period by recording engine 171. In some embodiments, if no mini-games are created for a video recording of a game play, the video recording of the game play may be erased after a defined time period by recording engine 171. In some other embodiments, if no mini-games are created the video recording of a game play, then the video recording of the game play is maintained till a mini-game is generated for at least a portion of the video recording and the remaining portion of the video recording may be erased after a defined time period by recording engine 171.

In one embodiment, the created mini-game may be posted to a webpage in a social network, via social connection manager 195, to enable sharing with one or more social network friends of user U0 in response to a request for sharing received from a user U0. Alternately, the created mini-game may be posted to a webpage in a game network maintained by game cloud system 110, for sharing with the user U0's game network friends based on a share request received from the user U0. Sharing, however, should not be limited to friends. Sharing can also be extended to other users that may have similar likes or game play similarities. In one embodiment, the request for sharing may be triggered in response to the user U0's selection of a share button provided on the display 132 within the GUI that presents the plurality of games. The share button option is one way of generating a request for sharing and should be considered exemplary and not limiting. Other forms or options for sharing may be provided and used to generate a request for sharing. In one embodiment, the request for sharing may be accompanied by a challenge comment provided by a user U0. The challenge comment, in this embodiment, is configured to be presented alongside the mini-game during sharing.

In one embodiment, the game code that defines a mini-game can be the same code of the full game from which the mini-game was created. During the creation of the mini-game by mini-game processor 172, game play metadata, which can include game state and other game attributes, such as game level, game challenge, etc., is used to identify what parts of the game code of the full game are needed to make an executable mini-game. A video segment generator within the mini-game processor 172 is used to identify the parts of the code that define the mini-game. The video segment generator interacts with game code mapper 314 to identify the code segment for the mini-game and forwards this information to the mini-game processor 172 for further processing to generate the mini-game. When the parts of the code of the full game are all identified, the code that defines the mini-game, in one embodiment, can be defined by pointers or references to the game code of the full game. By using points and/or references, the need to create new code packages for each produced mini-game is reduced. As users create mini-games from their game titles, the code or pointers for the created mini-games can be associated with the creating user in the user store 165. This way, each created mini-game can be defined by its original creator, and metrics regarding play of the mini-games can be attributed or linked to the creating user. For instance, if a particular user creates mini-game that are played and/or shared often with other users, the popularity of the mini-game can be tracked and ranked against other mini-games and users. Similarly, the ranking and status of the particular user creating the mini-game may be updated to reflect the extent of sharing and popularity of the user's posting of the created mini-game. A metric accumulator module 173 may be used to compute the various games and/or users' metrics based on the sharing and game play of the mini-games generated by the user U0. Details of some of the metrics that are computed will be explained in greater detail with reference to FIG. 6.

The user metrics are used to extend awards or other game-related perks to the user contributing to the generation of the mini-games. For example, a user that creates mini-games that are shared often or tagged with higher frequency can be provided with rewards. The rewards can be provided, for example, by the developer of the game title from which the mini-games are created. Alternately, the status of the user may be elevated based on the number of mini-games created and the level of sharing. The elevated status may be used in the offering of perks, game rewards, including free plays, free games, free game objects, monetary incentives, etc., to name a few. As more mini-games are made from particular game titles, the game title may grow in popularity and will encourage users to purchase a full version. In one embodiment, full versions of a game title are unlocked to enable mini-game creation. In one embodiment, play of a mini-game will allow creation of video recordings of the mini-game play, but may not enable creation of mini-games without having access to the full game title.

Still continuing with FIGS. 1A and 1B, in one embodiment, during a game play, user interactive input 136 entered by user U0 may be transmitted to game session manager 185 within game manager module 312 of game cloud system 110. User interactive input 136, besides input used to drive game play, may include challenge response (in the form of, for e.g., texts, images, video recording clips, etc.), in response to the challenge comment provided for the mini-game. The mini-game may be a mini-game that is created by user U0 based on a video recording of the game play, or a shared mini-game posted by other users, e.g., social network friends of user U0.

In one example, if user interactive input 136 is challenge response, the challenge response may be received by game session manager 185, which in turn informs the mini-game processor 172, and user processor 174 that the challenge response is received. The mini-game processor may be used to store the association of the challenge response to the post of the mini-game in a mini-game data profile stored for the mini-game in the mini-game data store 166. User processor 174 may be used to save a response pointer that points the challenge response association stored in the mini-game data store to the user profile associated with user U0.

In one embodiment, mini-game processor 172, during mini-game creation, may be used to analyze the content of a mini-game, and identify a video frame that is most representative of the content of the mini-game. Thus, when the mini-game is created, the mini-game may be associated with the identified video frame as an icon or still image. The more interesting the frame is, the more likely it is that the mini-game may be played by others. The generated mini-games are posted to one or more social network of user U0 and/or game network for sharing with other users. The posting of the mini-games is in response to a request for sharing received through a post/share option, as described above.

In another embodiment, mini-game processor 172 may be used to manage the mini-games stored in recorded game store 162. The mini-game management may include, but not limited to, mini-game classification, mini-game ranking based on other users' interactions to the mini-games, mini-game representative picture identification, mini-game view or execution initiation, etc. For instance, if certain mini-games have a higher number of user interactions, this may indicate that the content of the mini-game is interesting and/or is being posted and shared the most. In one embodiment, such user interactions are gathered by the metric accumulator 173, the information within analyzed to determine the type of user interaction and to compute one or more user and/or game metrics. The user and/or game metrics are used to select and organize the mini-games when the user accesses the games from the game cloud system. As such, depending on the popularity of the mini-games and popularity/status of the users creating the mini-games, some mini-games can be displayed more prominently on a website, relative to other mini-games, and such display define the degree of posting and sharing that such mini-games experience.

Once the mini-games are posted for sharing, other users' interactions at the mini-games are tracked. The user interactions of the mini-games may include the user content and the social network content of the mini-games. In one example, in response to the request to share received by the mini-game processor 172, the mini-game processor 172 may instruct social connection manager 195, via game session manager 185, to post some or all of the mini-games stored in recorded game store 162 at one or more social media providers 140 so that those mini-games can be viewed and/or played by the social network users. Social connection manager 195 may periodically pull social network content associated with those shared mini-games from social media providers 140, and save the social network content in social network data store 167.

The social network content of a shared mini-game may include, without limitation, the number of times the mini-game is viewed, played, shared, and recommended by the social network users. The social network content may also include the challenge comments and the number of comment responses made by social network users. In one embodiment, mini-game processor 172 may save a social network content pointer that points to the social network content for a mini-game to the mini-game data profile associated with the mini-game.

Figure 1C:
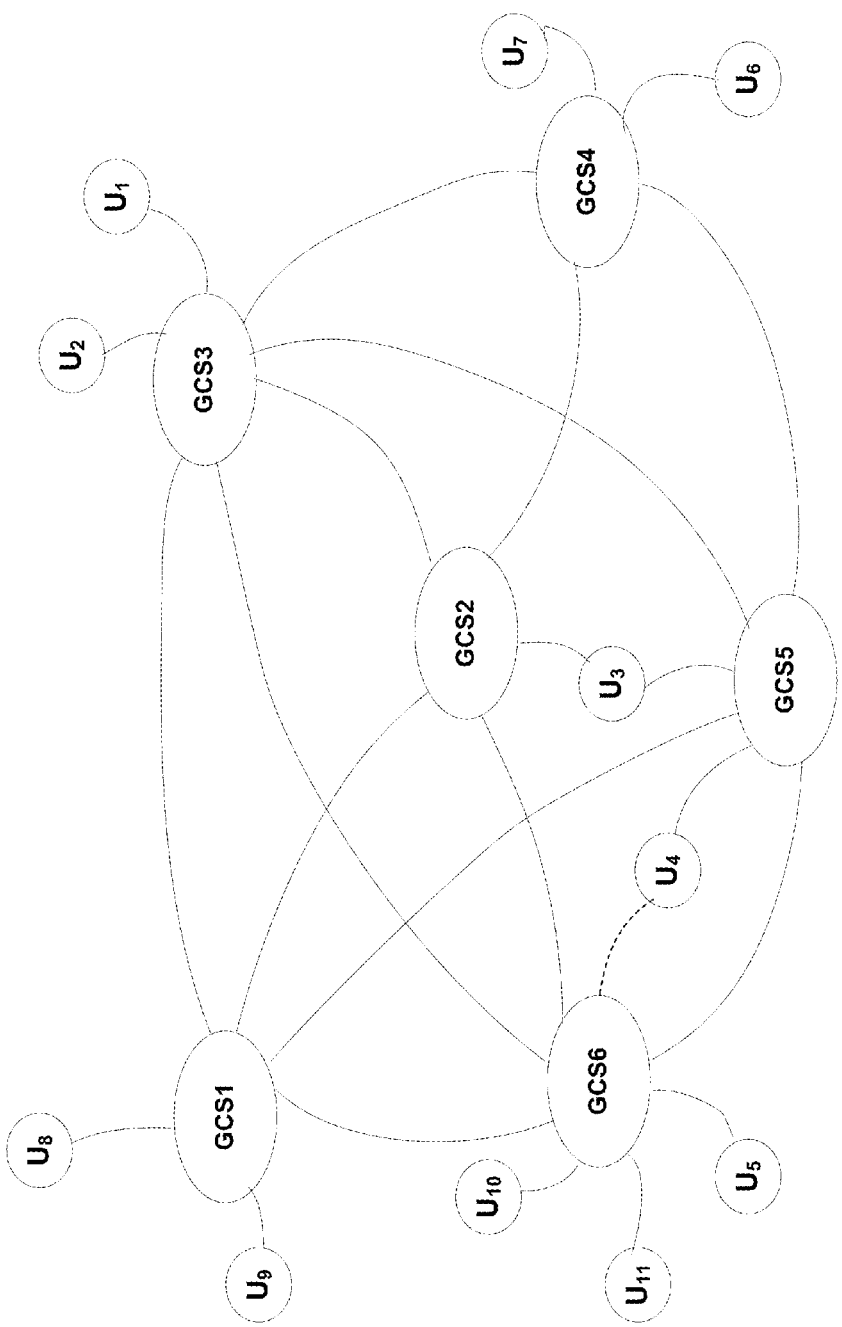
FIG. 1C illustrates a game cloud network, in accordance with one embodiment of the present invention.

FIG. 1C illustrates a game cloud network 100B, in accordance with one embodiment of the present invention. For example purposes only, the game cloud network 100B may include six game cloud systems (GCS1 to GCS 6), which are geographically distributed and interconnected. Also for purposes of example, eleven users (U1 to U11) are shown in FIG. 1B with different geographical distances to each of the six GCSs. To reduce latency, the GCSs are distributed and users that are more proximate to certain GCSs will be paired to the more local GCS.

As shown in FIG. 1C, users U1 and U2 are geographically located closer to GCS3, user U3 is located about in the middle of the distance between GCS2 and GCS5, user U4 is located in between GCS 5 and GCS 6 but is closer to GCS 6, users U6 and U7 are located near GCS4, users U8 and U9 are located near GCS1, and users U5, U10, and U11 are located near GCS6. Although six game cloud systems and eleven users are shown, it is to be understood that in practice, more or less game cloud systems may be included in game cloud network 100B, and more or less users may access the services provided by game cloud network 100B.

In one embodiment, each GCS in game cloud network 100B is located in a data center that houses computer systems and associated components to support multiple operating systems. As an example, the structure of each GCS may be similar to GCS 110 as shown in FIG. 1B. Although, it should be understood that a GCS may include fewer or more processing components or logic elements, depending on the processing desired. In one embodiment, each GCS in game cloud network 100B may communicate with other GCSs so that the information for various user profiles stored in respective game network user stores of a GCS can get updated and synchronized. Through the communication among the GCSs, game cloud network 100B can dynamically distribute the work load to provide load balancing and assign users based on the work load of each GCS and distance factors.

In one embodiment, when a user is trying to log into his or her user account online via a user device, depending upon the geographical location of the user, the user may be routed to a GCS that is closest to his or her user device. For example, because user U1 along with his or her user device is located near GCS3, user U1 utilizes the game services provided GCS3 after his or her user device is connected to GCS3. Similarly, user U2 may utilize the game services provided by GCS3, user U7 and user U6 may utilize the game services provided by GCS4, user U8 and user U9 may utilize the game services provided by GCS1, and user U5, user U10, and user U11 may utilize the game services provided by GCS6, based on geographical distance to respective CGSs.

In another embodiment, when a user is located approximately in the middle of two GCSs, the user may access the game services provided by both GCSs. For example, user U3 is located approximately in the middle of GCS2 and GCS5. When user U3 is trying to log into his account, the user device of user U3 may be connected to either GCS2 or GCS5, or both GCSs, depending upon the work load and latency of the GCSs. In still another embodiment, a user may be connected to a GCS that is not the closest one to this user because the GCS that is closest to this user is experiencing heavy work load. For example, user U4 may be initially connected to GCS6 because user U4 is located closest to GCS6. Due to heavy work load of GCS6, user U4 may be disconnected from GCS6 and be connected to GCS5. During the period of switching from GCS6 to GCS5, user U4 may be temporarily connected to both GCS6 and GCS5 for a while, and then get disconnected from GCS6 after GCS5 has replicated the game state of user U4 in GCS6. Thus, the switching from one GCS to another GCS is transparent to the user without affecting the user's experience with the game. In another example, user U4 may be directly routed to GCS5 because GCS5 has larger capacity than GCS6.

Figure 1D:
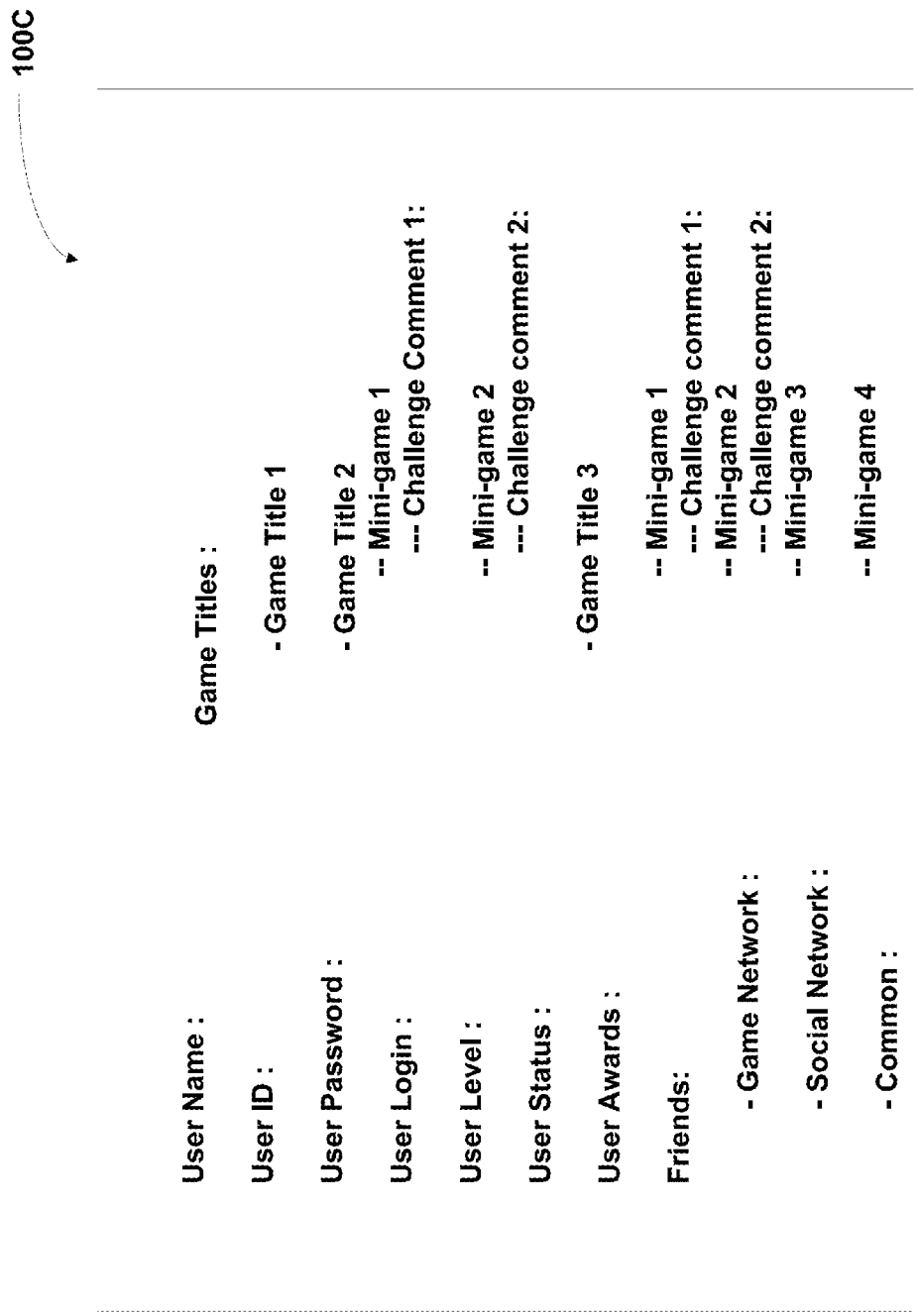
FIG. 1D illustrates an exemplary user profile stored in a game cloud system, in accordance with one embodiment of the present invention.

FIG. 1D illustrates an exemplary user profile 100C stored in a game cloud system 110, in accordance with one embodiment of the present invention. In one embodiment, user profile 100C may be saved in a user database stored in game network user store 165 of game cloud system 110. In this example, user profile 100C includes a "User Name" field, a "User ID" filed, a "User Password" field, a "User Login" field, a "User Level" field, a "User Status" field, a "User Awards" field, a "Friends" field, and a "Game Titles" field.

In one embodiment the friends field may be populated automatically by accessing external social networks. In this embodiment, the game cloud system may include code instructions that enable calls to external application programming interfaces (APIs) of social networks. The APIs can be used to query the social networks for data concerning the social grid defined within a social graph, and relationships stored in the social grid of the social network. The data obtained from the social grid may be used to share the mini-games with friends of the user, such as by automatically posting mini-games to newsfeeds of friends or the like. The shared mini-games include the challenge comment provided by the user that created the mini-game. These functions will enable wider sharing, tagging, rating, and commenting on mini-games as they are shared and used in greater extents. The friends/other users, in turn, may respond to the challenge comment by playing the mini-games. The user interactions defining one or more game plays of the friends and/or other users are received as inputs 136 by the mini-game processor 172 through the game session manager 185. The video segment generator within the mini-game processor 172 use the user inputs 136 to generate mini-game play videos. The friends/other users may also respond to the challenge comment within the mini-game by providing challenge response. The challenge responses are also received as user inputs 136. The mini-game play videos and any challenge responses are posted to the mini-game data store 166. The other users may, in turn, share the mini-games and the videos/mini-game play videos associated with the mini-games with their own friends/social contacts through one or more social network and/or game network.

In one embodiment, the "User Name" field, the "User ID" field, and the "User Password" field are used to record the name of the user, the ID assigned to the user when he or she created the user account in game cloud system 110, and the password set up by the user. The "User Login" field is used to indicate whether this user is currently logged into his or her user account. As discussed above, the user login information may be updated by user processor 174. The "User Level" field is used to indicate the game play levels of the user. The "User Awards" field shows the awards received by the user during previous game plays. The "User Status" field of the user is computed from one or more metrics collected during posting of the mini-game, sharing of the mini-game, and game playing of the mini-game by other users.

In one embodiment, the "Game Titles" field shows all available game titles for the user. The available game titles may be those that the user is able to freely play because either the user purchased the game or the game is free to play. In still other embodiments, the "Game Titles" field can show or identify the games that the user is able to see, such as, based on the rating of the games. If the play is a minor, selected games would be made accessible for that player.

As discussed above, a user may create one or more mini-games based on a video recording of a game title played by the user. If one or more mini-games are created for the game title, the created mini-games will be shown under this game title. In this example, there are three available game titles for the user (Game Title 1, Game Title 2, and Game Title 3). Within each game title, one or more mini-games may be created. For instance, two mini-games (Mini-Game 1 and Mini-Game 2) with one challenge comment each (Challenge Comment 1, Challenge Comment 2) are created from Game Title 2, and four mini-games (Mini-Game 1, Mini-Game 2, Mini-Game 3 and Mini-Game 4) are created for Game Title 3 with Mini-Games 1 and 2 each associated with a corresponding challenge comment (Challenge Comment 1, Challenge Comment 2). In one embodiment, the mini-games that are not associated with any challenge comments may be mini-games that have been generated but not been posted to any network for sharing. In one embodiment, the user can start to play a game by selecting (actively selecting through clicking, touching, etc.) on the available game title shown in user profile 100C.

In still other embodiments, mini-games can be shown on a separate webpage, where a user can select to play mini-games created by the user or created by other users. In these embodiments, the mini-games shown on the webpage are the ones that are posted by one or more users for sharing. The mini-games shown can be organized based on game-types, genres, age appropriate content, popularity amongst users of a network, etc. Mini-games having larger numbers of user interactions (e.g., plays or tags) or provided by a highly ranked user maybe ranked higher and/or placed in a more prominent location on the webpage. From this webpage of mini-games, other users can access to play such mini-games or share the mini-games with others within the game network or externally via social networks.

In one embodiment, a mini-game may be created by a user that owns or has access to a full version of the game that is used to create the mini-game. When a user plays the full version of the game, a video recording is created of the game play. From this video recording, the user can select a portion of the video recording (e.g., a starting point and an ending point). This portion of the video is saved and associated to the user. In addition, this portion is used to identify metadata and state data that was created when the full version of the game was played to create the video recording. This information is in turn used to identify the code parts of the full game code that will be required to create an executable mini-game that will encompass at least the functionality seen in the portion of the video that was selected from the video recording.

In one embodiment, once the mini-game is created, the mini-game may have two parts. For example, a first part is the portion of the video selected by the user, from the full video recording. This portion can be posted and shared, so that other users can see a video of the creating user's game play and the results (which may have been interesting). Once a person views the video portion, the person can elect to play a mini-game for that portion of video.

Also for example, a second part is the executable mini-game. As in the example above, if the portion of the video shows the user jumping an obstacle on a bike, the mini-game will provide code to allow another player to attempt the jump of the obstacle on the bike. The executable code of the mini-game allows the users to play the mini-game and will compute game scores for the mini-game based on the user interactions received from the other users during game play. The game score related to the mini-game achieved by the original player using the full game can then be compared to the score achieved by the other player during the game play of the mini-game. The game score of the other player may be greater than, less than or equal to the score achieved by the creating user. Depending on the score and depending on the interest of the other users for sharing this information, the game score may be updated to the game cloud system as a response to the challenge comment and may also be shared with other users.

To provide the option to further share, a third part may be the creation of a mini-game video portion that is a recording of game play of the mini-game by other users. Thus, as more players play the mini-game, there will be many mini-game video recordings of those game plays, which will also be saved and associated with the original mini-game and to the players that played the mini-game.

In this example, however, the creator of the mini-game is going to be the owner of the full version of the game. If the person playing the mini-game wishes to make a mini-game him or herself, that person can purchase the full copy (or full locked access) and produce his or her own mini-games that can be shared in the same way.

In one embodiment, the "Friends" field in user profile 100C shows the user's friends in both game network and social network. In this example, the user's game network friends are shown under the "Game Network" sub-field and the user's social network friends are shown under the "Social Network" sub-field. The user's friends who belong to both the game network and the social network may be listed under the "Common" sub-field.

For a user profile stored in game network user store 165, the "User Name" field, the "User Login" field, the "User Level" field, the "User Status" field, and the "User Awards" field may be viewable to other users in the game network, while the other fields in the user profile may not be viewable to other users. In one embodiment, a user may select whether to make the "Friends" field in his or her user profile to be viewable by other users.

Figure 2:
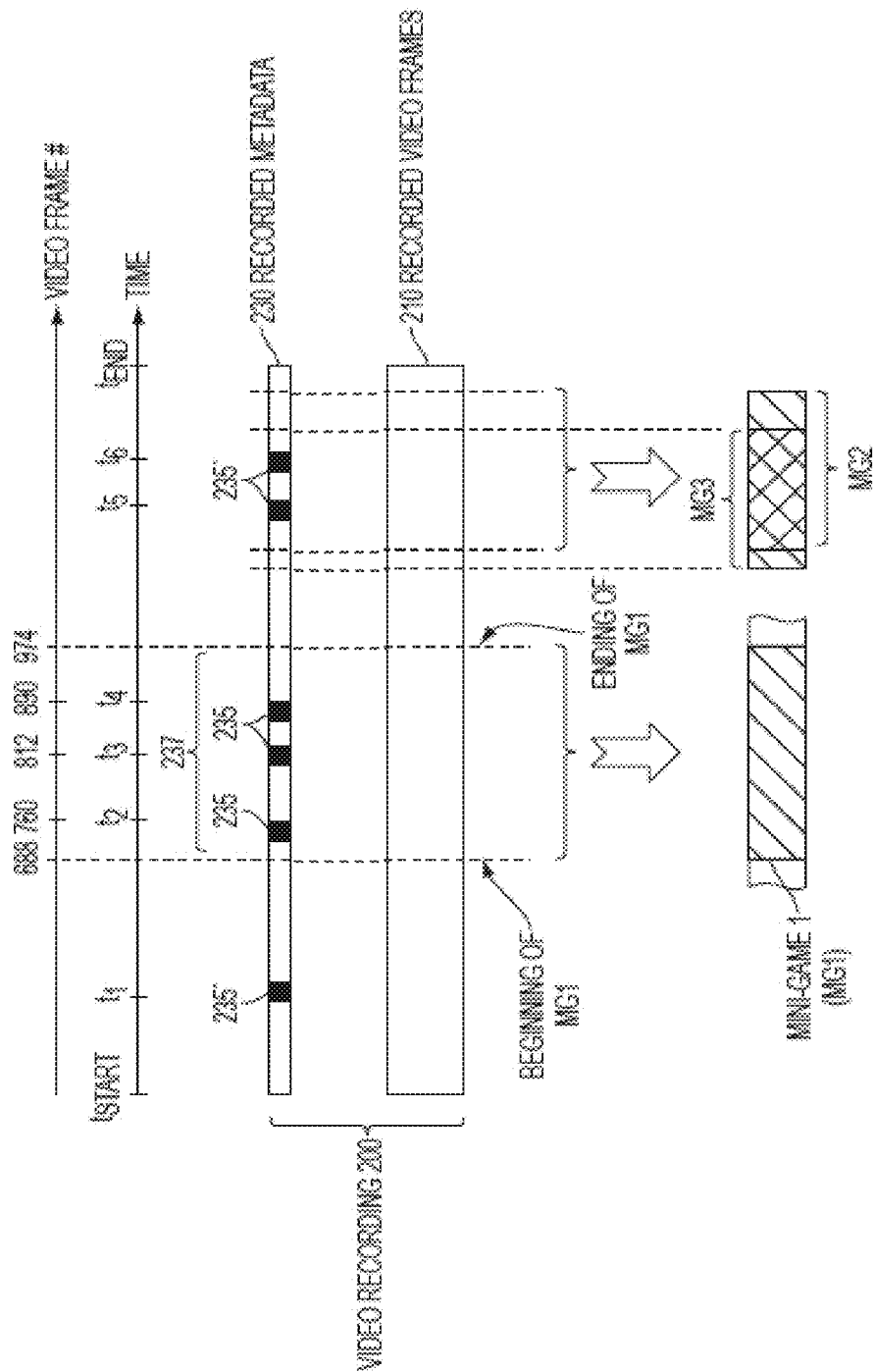
FIG. 2 illustrates mini-games created based on a video recording, in accordance with one embodiment of the present invention.

FIG. 2 illustrates mini-games created based on a video recording 200, in accordance with one embodiment of the present invention. In this example, after a user (or a game player) has played an available game title, either the complete game or part of the game, the game played may be saved as video recording 200, e.g., in recorded game store 162. In this example, video recording 200 includes recorded video frames 210 for the game played, and recorded metadata 230.

In one embodiment, the game player may create a mini-game (MG) based on video recording 200 by defining a portion of the recorded video. The portion is defined by indicating a start position and an end position of the mini-game within the video recording, during or after a view of video recording 200. For example, using recorded video frames 210, the game player may choose video frame 688 as the beginning of MG1 and video frame 974 as the ending of MG1 by clicking and unclicking a mini-game creation check box displayed on a screen, respectively. Other controls may also be provided to indicate the desire to create a mini-game, such as touch screen inputs, voice inputs, gesture inputs, etc. The mini-game processor module 172 within the game processor executing on a game server within the game cloud system will detect the selection of the video frames 210 and interact with the game code store 161 of the game processor module to identify the game code that corresponds to the selected video frames. The identified game code is associated with the created mini-game along with the selected video frames defining the video of the created mini-game MG1. The created MG1 is playable to view the video recording of MG1 that is a portion of video recording 200, and is executable to play game code of MG1 that is a portion identified from the full game code of the original game title played by the game player using the selected video frames. The video recording of MG1, in one embodiment, has associated therewith metadata 237. When the video recording of MG1 is viewed, the associated video frames for MG1 are shown. The metadata 237 will identify the attributes of the mini-game including the game level, game status, game objects used, etc.

In another embodiment, multiple mini-games can be created based on video recording 200. As shown in FIG. 2, MG1 is not overlapped with MG2 and MG3, and MG2 and MG3 are partially overlapped with each other. In one embodiment, the created mini-games, e.g., MG1, MG2, and MG3, may be saved in recorded game store 162 by mini-game processor 172 of game cloud system 110.

Figure 3A:
FIG. 3A illustrates a mini-game data profile stored in mini-game data store, in accordance with one embodiment of the present invention.

FIG. 3A illustrates a mini-game data profile 300A generated during creation of the mini-game, in accordance with one embodiment of the present invention. In one embodiment, mini-game data profile 300A is saved in a database stored in mini-game data store 166 of game cloud system 110.

In this example, mini-game data profile 300A may include, without limitation, the "Mini-game Name" field, the "Original Game Title" field, the "Mini-game Code" field, the "Mini-game Beginning Data" field, the "Mini-game Ending Data" field, the "Video Content" field including "Game Video Data" and "Mini-Game Video Data" sub-fields, the "Social Network Content" field, the "Mini-game Creator" field, the "Mini-game Creation Time" field, the "Mini-game classification" field, and the "Mini-game Ranking" field. The "Mini-game Name" field is used to record the name of the mini-game, and the "Original Game Title" field is used to list the name of the original game based on which the mini-game is created. The name of the user who created the mini-game along with the mini-game creation time may be recorded under the "Mini-game Creator" field and the "Mini-game creation Time" field, respectively.

The "Mini-game Code" field is used to record a game code beginning pointer that points to the beginning of the game code of the original game and a game code ending pointer that points to the ending of the game code of the original game. It should be understood that the beginning and end of the game code is simply used to connote the start and end of the mini-game, which is constructed or assembled using the game code of the full game. In many instances, the mini-game will inherit game code settings (i.e., pre-defined setup parameters) that may have been set when the game was first played in the context of the full game. For example, if the character is customized to have a particular look that customization may be selected for the mini-game segment. In other embodiments, default customizations or settings are automatically made in the definition of the mini-game code. In one embodiment, the "Mini-game Beginning Data" field is used to record a video beginning pointer that points the beginning of the video recording of the game play for the mini-game created out of the original game title. In one embodiment, the "Mini-game Ending Data" field is used to record a video ending pointer that points to the ending of the video recording of the game play for the mini-game.

In one embodiment, the "Game Video Data" sub-field under the "Video Content" field may be used to record information related to the game play of the game and the "Mini-Game Video Data" under the "Video Content" field may be used to record information related to the video recording of the mini-game during the mini-game creation. The information may include setup parameters, game object attributes, number of mini-games created, popularity of the mini-game, difficulty level, etc.

In one embodiment, the "Social Network Content" field may be used to record the number of times the mini-game is tagged, shared, played, viewed, commented on, and recommended. The rate at which any of these social actions take place can also be tracked, which can be used as a metric to infer a higher or lower rating.

In one embodiment, the number of times the mini-game is shared may be recorded under the "Shared" sub field. In one embodiment, the number of times the mini-game is played or executed may be recorded under the "Played" sub field. In this embodiment, the "Played" recording may correlate to the number of users of the social and/or the game network that responded to the challenge comment that accompanies the mini-game when the mini-game was created. The number of times the mini-game is viewed may be recorded under the "Viewed" sub field. The number of times the mini-game is recommended may be recorded under the "Recommended" sub field. The "Social Network Content" field may also be used to record the number of comments entered by network users, e.g., under the "Comments" sub field.

The "Mini-game Play Videos" sub field under the "Social Network Content" field may be used to record the number of mini-game play videos created based on the executions of the mini-game, the names of the users who created those mini-game play videos along with their playing scores. In addition to the above metrics, the "Social Network Content" field may also include rating of the mini-game provided by the other users, in one embodiment. In this embodiment, the rating may be provided by the other users in response to the Challenge comment and may reflect the relative level of difficulty of the mini-game as envisioned by the other users. In one embodiment, the rating may also be computed based on number of recommendations provided by other users. In one embodiment, one or more of the metrics specified within the "Social Network Content" field may be used to compute "User Status" of a particular user. The "User Status" of a particular user may be computed based on the number of other users that respond to the challenge comment of the mini-game posted by the particular user, the number of recommendations that the mini-game garners, the rating of the mini-game provided by other users, etc. In one embodiment, the social network content of a mini-game may be received via social connection manager 195 of game cloud system 110. These examples are provided for clarity, but it should be understood that fewer or more metrics can be captured or displayed to generate the ranking data.

In one embodiment, mini-game processor 172 of game cloud system 110 may classify the mini-game based on the pre-defined categories. For example, the mini-game may be classified as an action mini-game. The classification of the mini-game may be recorded under the "Mini-game Classification" field. Further, mini-game processor 172 of game cloud system 110 may be used to rank all of the mini-games in each classified category based on the video content and the social network content associated with each mini-game. The ranking of a mini-game may be saved in the "Mini-game Ranking" field. Additional classification may be provided within each category, as will be described with reference to FIGS. 4A-4C.

Figure 3B:
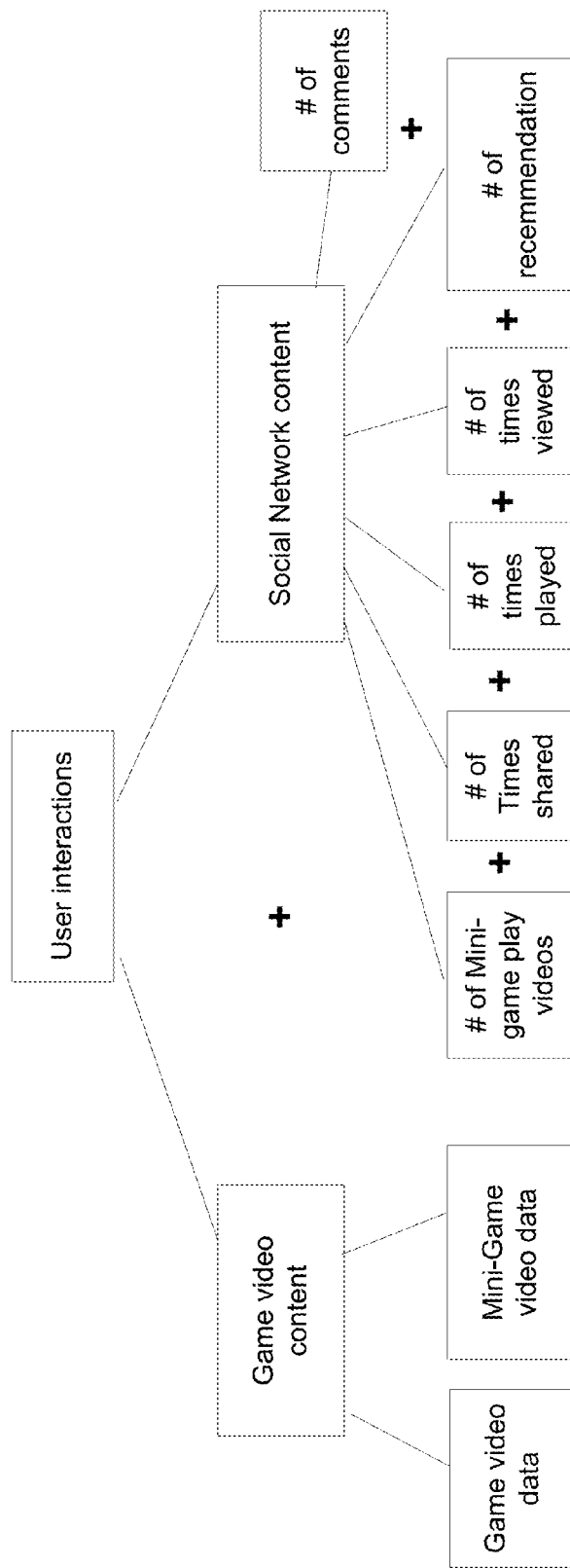
FIG. 3B illustrates a block diagram showing the components of the user interactions defining user metrics and/or game metrics for a shared mini-game, in accordance with one embodiment of the present invention.

FIG. 3B illustrates a block diagram 300B showing example components of the user interactions for a shared mini-game, in accordance with one embodiment of the present invention. As shown, the user interactions of a shared mini-game may include the game video content and the social network content of the mini-game. The game video content may further include game video data and mini-game video data. The game video data is entered for the video frames associated with the video game during the execution of the game play for the original game title, based on which the mini-game is created. The mini-game video data is entered for the mini-game video frames associated with the mini-game. The video data can also include, for example, user ratings, mini-game/game levels, etc. The user ratings can include thumbs up, star ratings, likes, dislikes, approvals, disapprovals, etc.

The social network content of the mini-game is generated by the social network users after the mini-game is posted for sharing in a social network or a network site, such as the game network. For example, the social network content may include, without limitation, the number of times the mini-game is shared, the number of times the mini-game is played, the number of times the mini-game is viewed, and the number of times the mini-game is recommended by various users in the social network. The social network content may also include the number of comments (i.e., challenge response) made by the social network users in response to the challenge comment provided within the mini-game, and the number of mini-game play videos created based on the execution (or play) of the mini-game. Further, the number of times the created mini-game play videos are viewed may also be included in the social network content. In one embodiment, social network users can rate the shared mini-game, e.g., by giving one to five stars. In another embodiment, the social network users can rate the shared mini-game using a numerical scale. The social network content may also include the user ranking (not shown) for the mini-game.

Figure 4A:
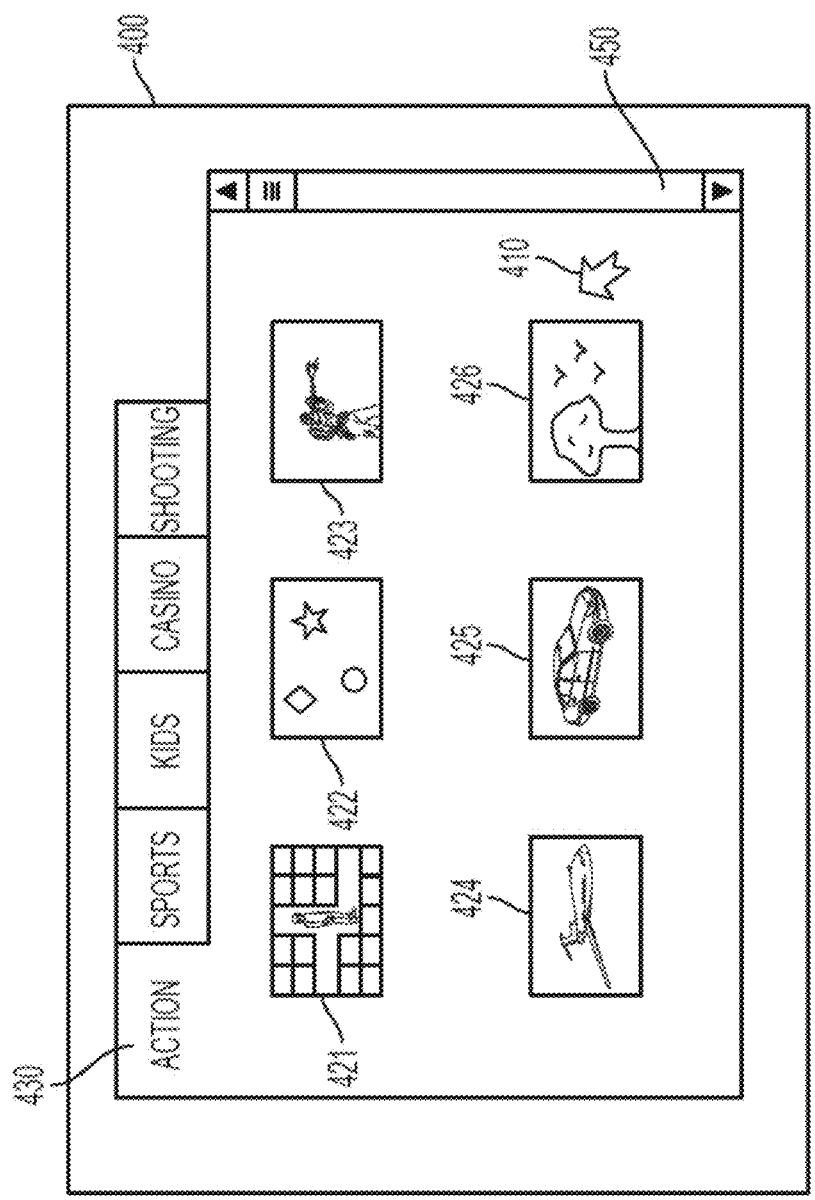
FIG. 4A illustrates a generic social network web page showing the classified and the ranked mini-games, in accordance with one embodiment of the present invention.

FIG. 4A illustrates a social network webpage 400 showing the classified and the ranked mini-games, in accordance with one embodiment of the present invention. In this example, all of the mini-games, which are posted in the social network for sharing, are classified based on the following pre-defined categories: Action, Sports, Kids, Casino, and Shooting. Other categories are possible, and this is only one example. The mini-games in each classified category are displayed in the form of category tabs. It is to be understood that mini-games can be classified based on other unlisted categories. In this embodiment, webpage 400 shows the mini-games in the Action category and the mini-games in other categories are hidden. The mini-games in other categories can be shown if the corresponding category tab is clicked. As used herein, the example of clicking shall be understood to be user input. The user input can be made via any number of ways, such as by computer mouse, game controllers, touch input, gesture input, voice input, etc. For example, if the Sports category tab is clicked by a user using mouse cursor 410, the mini-games in the Sports category will be shown and the mini-games in the Action, Kids, Casino, and Shooting categories will be hidden. In an alternate embodiment, the social network webpage 400 may be used to access the games in the game network through a user account. In this embodiment, a user can select one of the games to generate one or more mini-games and post the created mini-games to the social network and/or game network for sharing. The posted mini-games may include a challenge comment issued by the user creating the mini-game.

The mini-games in the Action category may be displayed in the forms of mini-game symbols (e.g., mini-game icons or thumbnails) with each mini-game symbol having a representative picture/image. In one embodiment, the representative picture/image is a mini-game video frame that is representative of the content of the mini-game.

In the example of mini-games illustrated in FIG. 4A, six mini-games symbols (421, 422, 423, 424, 425, and 426) are shown at one time in the Action category tab 430. Alternatively, more or less mini-game symbols can be displayed at one time in a category tab. In one embodiment, if there are more mini-games than the ones already displayed in the Action category, the other non-displayed mini-games can be shown by clicking either the upper or down arrows in scroll bar 450.

In one embodiment, the mini-games may be stored in recorded game store 162 of game cloud system 110, and displayed by mini-game processor 172 based on the classification and ranking of each mini-game. In one embodiment, the mini-games in a classified category may be ranked based on the user interactions of mini-games in a classified category.

In one embodiment, the representative picture displayed on top of a mini-game symbol (e.g., a picture image) is a mini-game video frame that is representative of the content. The representative picture may be updated as the content of the mini-game changes over time based on user interaction. For example, a user's interaction to overcome an obstacle within the mini-game may change over time based on repeated game play of the particular mini-game. Such changes are captured and the frame that best represents the content may be used as the representative picture. Mini-game processor 172 of game cloud system 110 may be used to identify the representative picture for each mini-game displayed using information stored in the recorded game store 162 and mini-game data store 166.

Figure 4B:
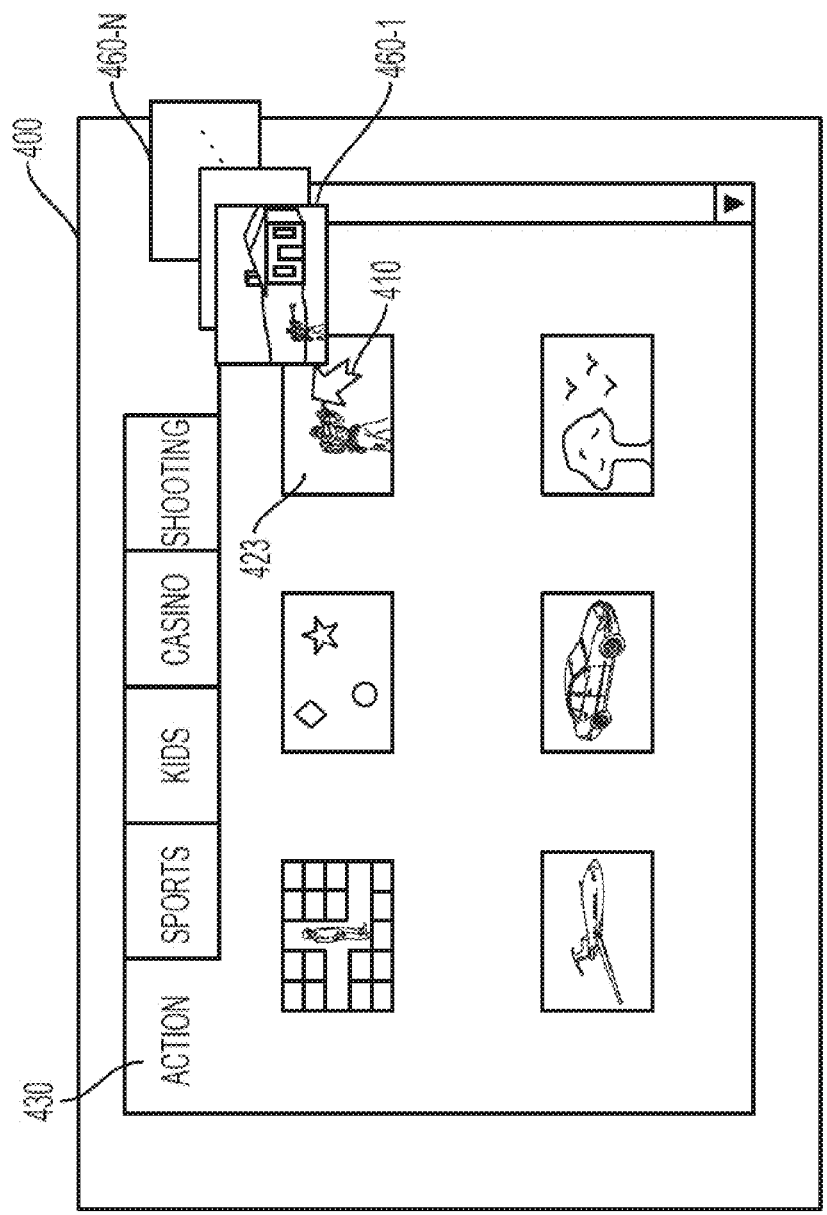
FIG. 4B illustrates an instant replay of a displayed mini-game rendered on the social network web page, in accordance with one embodiment of the present invention.

FIG. 4B illustrates an instant replay of a displayed mini-game, in accordance with one embodiment of the present invention. In one embodiment, mouse cursor 410 may be hovered over a displayed mini-game symbol to render an instant replay (or partial replay) of the video frames of the mini-game represented by the mini-game symbol, without the mini-game symbol being clicked. The instant replay can help a user to quickly search for a mini-game he or she likes.

In this example, when a user hovers mouse cursor 410 over mini-game symbol 423 (e.g., passively select), the video frames (460_1 to 460_N) of the mini-game represented by mini-game symbol 423 will start to play without having to select the mini-game symbol 423. When a user finds a mini-game he or she likes, the user can double click (e.g., actively select) the mini-game symbol to launch or start instant play from the cloud gaming system in streaming mode. Alternatively, the user may double click a mini-game symbol to open another webpage that shows the mini-game represented by the mini-game symbol along with other related information.

Figure 4C:
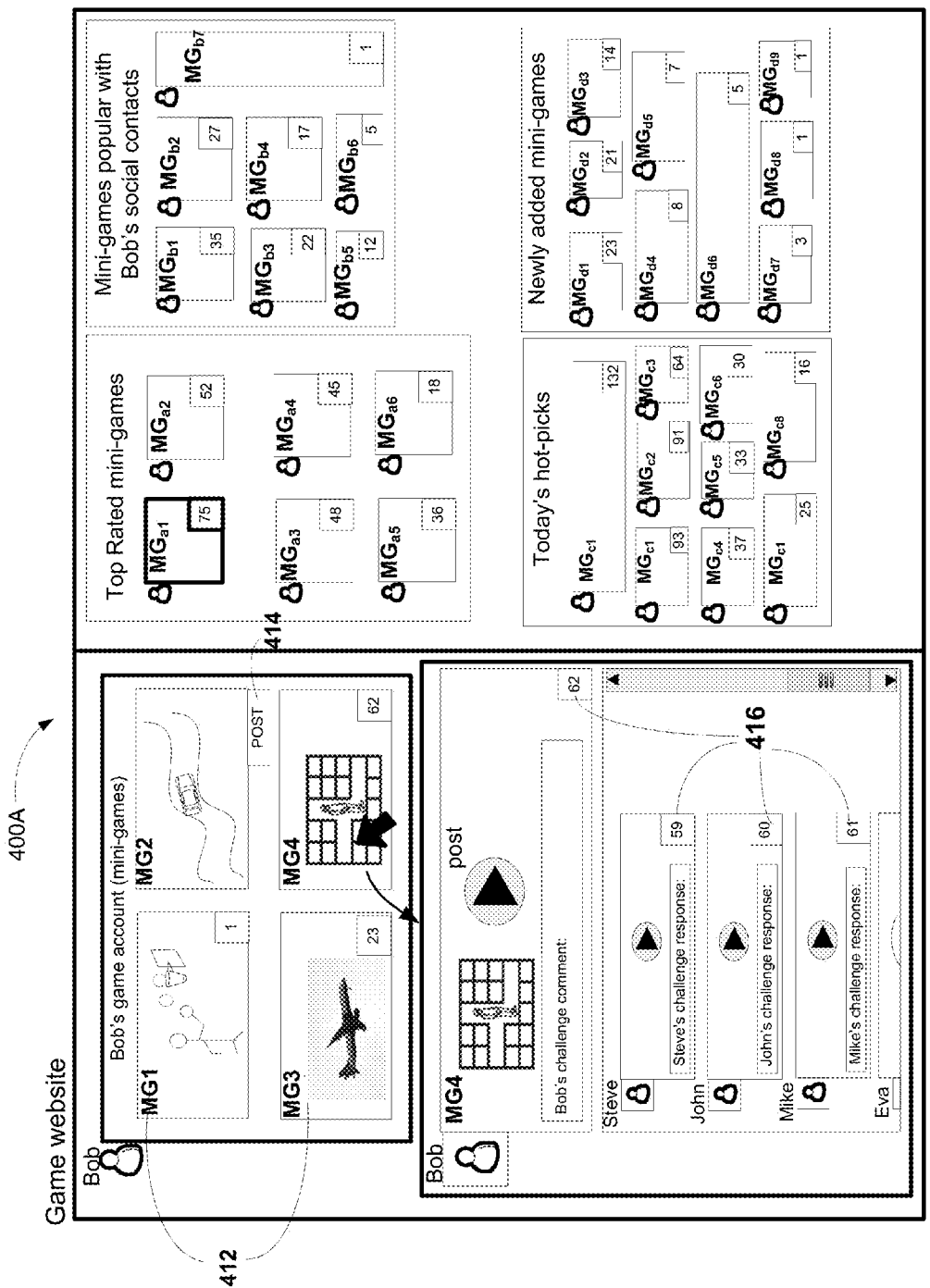
FIG. 4C illustrates a webpage of a game cloud system website rendering an exemplary game library of sorted and classified games/mini-games available to a user upon accessing the game cloud system and a game interface for viewing the mini-game posted by the user, in accordance with one embodiment of the present invention.

In an alternate embodiment illustrated in FIG. 4C, a game network webpage 440 provides an organized list of the classified and ranked mini-games in response to user accessing a user account on the game network, in accordance with one embodiment of the present invention. In this embodiment, the mini-games presented in the game network webpage 440 may be organized under categories that are different from the one rendered or may be part of the categories illustrated in FIGS. 4A and 4B. For example, some of the categories may include, "mini-games previously created/viewed by the user," "Top Rated mini-games," "mini-games with challenge posted by social contacts of the user," "Today's hot picks," "Newly added Mini-games," to name a few. These categories, in some embodiments, may be sub-categories within the categories illustrated in FIGS. 4A and 4B. Some of the mini-games rendered in the webpage may not be posted to game network or social network for sharing.

For instance, as illustrated in FIG. 4C, some of the mini-games, such as MG2, created by the user who is accessing the user account of the game website may not be posted to game network or social network for sharing. It should be noted herein that some of the mini-games that are created by the user accessing the user account are the ones that may or may not be posted to a network for sharing. On the other hand, the mini-games that are posted by other users to the network have to be posted for sharing in order for such mini-games to be included on the webpage of any website or social network stream/newsfeed for access and play. An indicator, such as "posting-indicator" may be provided with the mini-games to indicate the sharing status of the mini-games. For instance, mini-games MG1, MG2, MG3 and MG4 are created by the user Bob. Further, mini-game MG1 is posted for sharing as evidenced by the challengee counter within a "posting-indicator" box indicating "1". In this instance, when the mini-game MG1 is posted, the challengee counter within the posting-indicator is incremented by 1. Similarly, mini-game MG3 has been posted and at least 22 other users have accepted the challenge and played the mini-game as evidenced by value 23 in the posting-indicator box—1 for the initial post for sharing and 22 other users that have accepted the challenge and played the mini-game. Along similar lines, mini-game MG4 has been posted and at least 61 other users have accepted the challenge and played the game. Thus, based on the value in the posting-indicator box, one can deduce whether the mini-game has been posted for sharing and the number of users that have accepted the challenge and played the mini-game shared by a user.

In one embodiment, a mini-game may be created and not posted for sharing. For example, Mini-game MG2 has been created but not shared with anyone in the game network and/or social network. This is evidenced by the presence of the mini-game icon but a lack of a posting-indicator box.

In the embodiment illustrated in FIG. 4C, the mini-game that is created and not posted is a mini-game MG2 that was created by user Bob. In this example, the game processor will provide an option, such as a "Post" option 414 at mini-game MG2, for posting the mini-game to one or more networks. The "Post" option will also allow the user to generate a challenge comment that is posted alongside the mini-game when posted. When the user Bob selects the mini-game for sharing, the game processor will detect the active selection activity at the mini-game MG2 and post the mini-game for sharing to one or more networks as specified by user Bob in his request along with the challenge comment. When the mini-game is posted, the challengee counter within the posting-indicator box will be incremented by 1, as shown in mini-game MG1. As users respond to the challenge, the posting-indicator box at each user's mini-video game play box is dynamically updated to reflect the number of users that have accepted the challenge and the same is also updated to the original post, as evidence by the different values within the posting-indicator boxes 416 of the different users and the final count is reflected in the original post MG4 that indicates a value 62 in the posting indicator box.

If user Bob selects a mini-game (created by him or by any other user) through active selection activity and the selected mini-game has already been posted, the active selection activity will prompt the game processor to show the original post of the mini-game with game plays of all the users that have responded to the challenge. As illustrated in FIG. 4C, based on the active selection activity (indicated by the cursor) at mini-game MG4 by user Bob, the list of users that have responded to the challenge and the corresponding challengee counter within the posting-indicator 416 is rendered at the user interface of game play within the webpage of the game website of user Bob. As more users respond to the challenge, a navigation bar (or scroll function) may be provided to view the game plays of all the responders along with any challenge responses provided by the responders during mini-game plays.

In one embodiment, the challengee counter can be incremented upon the posting of the mini-game for sharing with other users. As more and more users respond to the challenge, the posting-indicator box provided within the mini-game play interface gets dynamically updated to reflect the current number of users that played the mini-game, as evidenced by the changing values of the challengee counter within the posting-indicator boxes 416 provided within the mini-game play interface of different users in FIG. 4C.

The current number of users that have accepted the challenge and played the mini-game is also reflected in the original challenge post MG4 that indicates a value 62 in the posting-indicator box. The challengee counter provides a good indication of whether the mini-game was posted or not and whether other users have accepted the challenge and played the mini-game. The challengee counter is rendered alongside the mini-game (or some other visible location) and updated to the mini-game data store and user data store of all the users that generated the mini-game and played the mini-game.

When a user accessing the webpage 440 hovers (i.e., passively selects) over a mini-game from the list of mini-games, the video segment of the mini-game is rendered in a portion of the webpage 442. Alternately, the video segment may be rendered in a new window, in a pop-up window, etc. When a user clicks/double clicks (i.e., actively selects) a mini-game from the list of mini-games from the display 132 of the user device 100, the executable portion of the mini-game is rendered at the game server. In response to the execution of the mini-game at the game server, the user interface at the display of the user device 100 is updated with information related to game controls. The information is used to define controls that are appropriate for the user device 100 to enable the user to play the mini-game. Further, the user interface provides a rendition of the game play and accepts user interactions through the game controls specific for the client device. The user interface for game play of the mini-game may replace the GUI where the plurality of mini-games was rendered, or may be provided in a pop-up window or a new window.

Figure 4D:
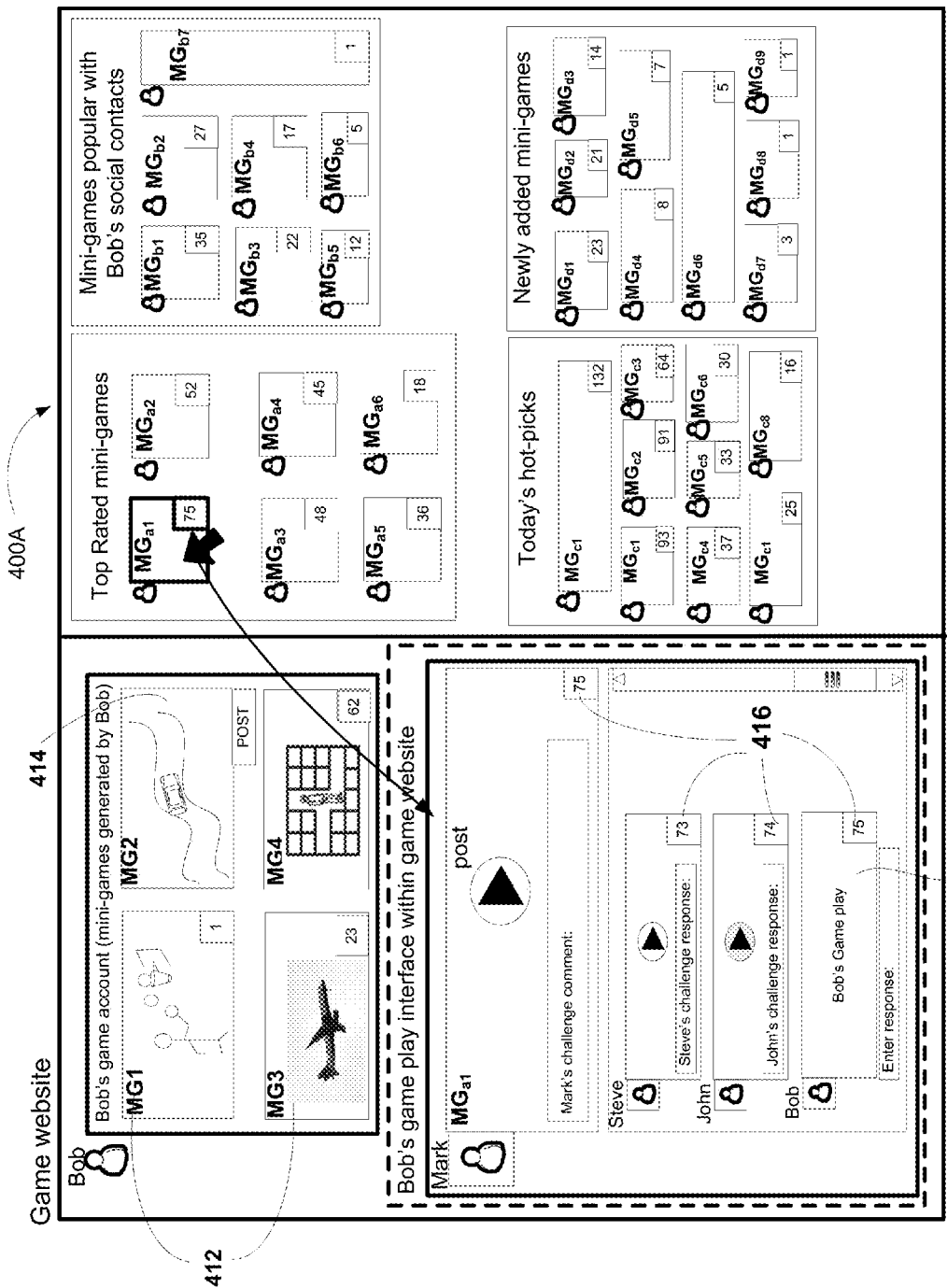
FIG. 4D illustrates a webpage of FIG. 4C with the game interface for viewing and playing a post of a different user in response to the challenge posted by the different user, in one embodiment of the invention.

In another embodiment illustrated in FIG. 4D, the mini-game selected for play by user Bob may be a post shared by another user. For instance, user Bob may accept a challenge extended by user Mark by selecting Mark's mini-game $MG_{a1}$, and play the game. When user Bob passively selects the mini-game $MG_{a1}$, a video of game play of the mini-game generated by user Mark will render at the user-interface of the display of the client device of Bob. When the user Bob actively selects the mini-game $MG_{a1}$, a user interface of game play will be rendered enabling the user Bob to play the mini-game $MG_{a1}$. In this embodiment, user interface of game play provided by the game processor module will include the original post of $MG_{a1}$'s creator, responses by the other users that have accepted the challenge and a game play interface for user Bob to play the game and generate a mini-game play video and any response to the challenge.

It should be noted herein that each mini-game that has been shared will include a mini-game posting indicator box (i.e., challengee box/indicator) that is non-zero. User Bob may play the mini-game $MG_{a1}$, generate a mini-game play video and post the mini-game play video in response to the challenge. User Bob may also share the mini-game $MG_{a1}$ with other users in the form of a link using a share/post option available to user Bob. The share option is exemplary and should not be considered limiting. Other forms of sharing/posting may be used. When other users access the mini-game $MG_{a1}$ shared by user Bob, they will be directed to the original post of the user Mark that created mini-game $MG_{a1}$ and the posting indicator box of mini-game $MG_{a1}$ will be incremented to reflect the current challengee counter value when the other users accept the challenge and play the mini-game. Each of the mini-game play videos and challenge response are updated to the mini-game data store and game network user store 165. A navigation bar may be provided to enable any user to view the responses from all the other users that have responded to the challenge.

In one embodiment, the posting of the mini-game provided in the webpage of the game website accessed by user Bob, may include other game metrics, such as the mini-game score of the creator of the mini-game, challengee count of the mini-game, etc. For a mini-game that is just created, the challengee counter is one and the game score may be the score achieved by the user creating the mini-game. In one embodiment, as other users accept the challenge, the mini-game score in the main post of the mini-game may be updated with a mini-game score of another user that achieved a score higher than the user that created the mini-game. In this embodiment, the user ID of the user that achieved the higher score may also be rendered alongside the mini-game score in the main post of the mini-game. In one embodiment, the game score with the user ID may be provided as a link, which when selected may direct a user to the mini-game play video of the user whose higher score is rendered at the main post of the mini-game.

In addition to the challengee counter, the mini-game post may also render an image or avatar of a user, user ID, status of a user within the game network and a rating of the mini-game as provided by other users or as computed based on the level of sharing and level of responses received for the mini-game. In one embodiment, the status of the user creating the mini-game is computed based on the number of mini-games that was created by the user, number of other users that played the mini-game, number of users that viewed the mini-game, number of users that recommended the mini-game, etc. The status indicates the relative ranking of the user within the game network.

For instance, the status of a user may be in the form of a ranking, such as Platinum rank, Gold rank, Silver Rank, Bronze rank, etc. The above form of providing status is exemplary and other forms of providing status may be used. In some embodiments, depending on the relative ranking of the user, incentives may be provided by a video game owner. The incentives may be in the form of monetary awards, game object awards, unlocking of one or more games/game levels, providing free plays, or additional incentives/perks. These incentives are provided to keep the user engaged and involved with the games within the game network.

Figure 5A:
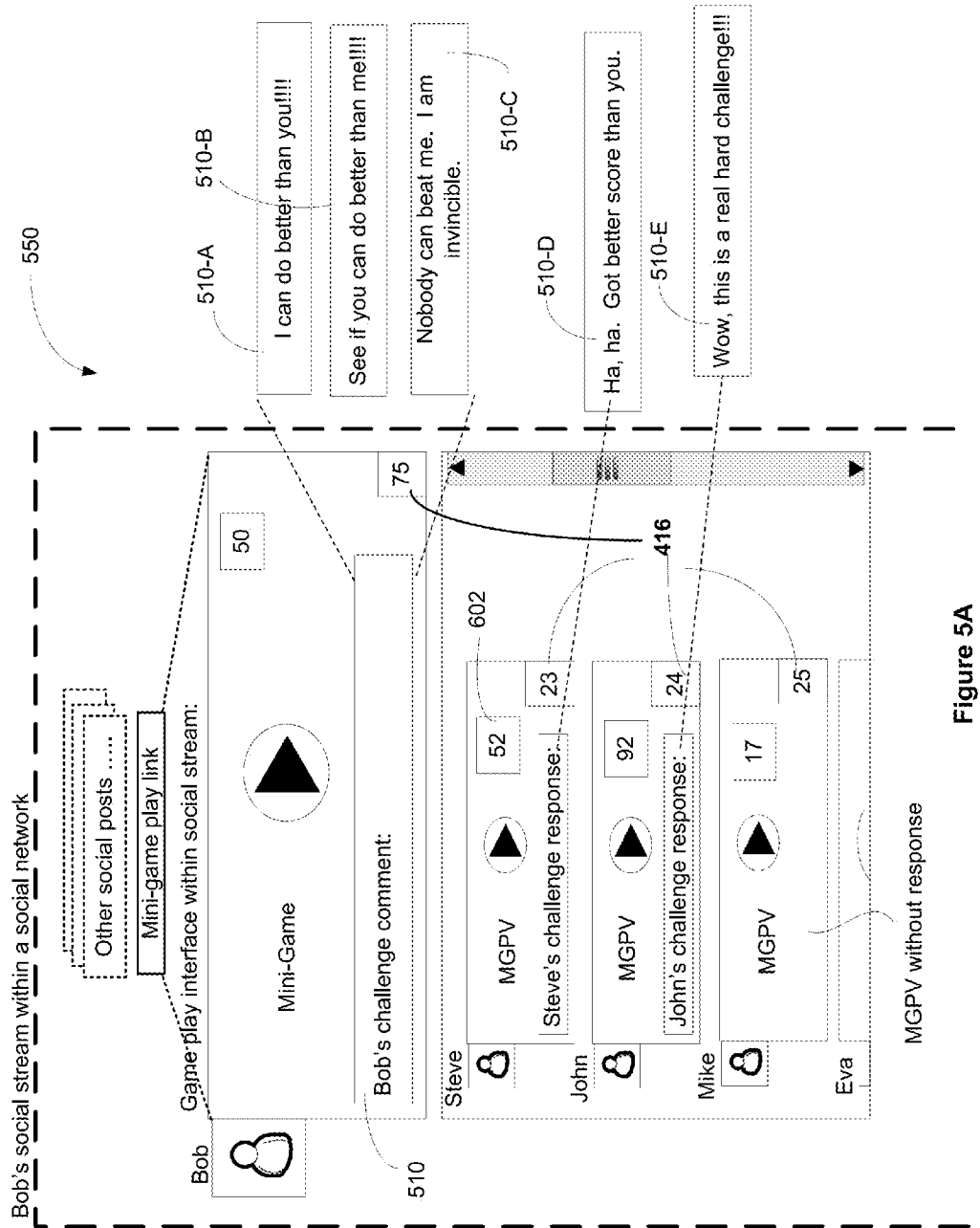
FIG. 5A illustrates a social stream/newsfeed within a social network of a first user rendering a mini-game post for game play with challenge comment and associated posts by other users responding to the challenge comment, in accordance with one embodiment of the present invention.

FIG. 5A illustrates an exemplary user interface 550 within a social stream of a social network from which a network user (for e.g., user Bob) accesses and plays the mini-game, in one embodiment of the invention. User Bob accesses the game post that includes a mini-game video segment indicated by a mini-game video view icon, an executable portion of the mini-game and any challenge comment 510 provided by a creator of the mini-game. The game post may be provided as an internal link to enable the user to access and play the game from within the social network stream or may be provided as an external link to enable the user to play the game from a game network or other network website as specified in the external link.

In this instance, the mini-game and the challenge comment is created by user Bob. Some examples of challenge comments (comments 510-A through 510-C) are illustrated in FIG. 5A. In response to the challenge comment, a plurality of users, Steve, John, Mike, Eva, etc., may play the mini-game. The game play is captured in a mini-game play video. Users may also respond to the challenge comment in the form of a challenge response 510-D and 510-E, etc. Each mini-game play generated by other users that accept the challenge along with any challenge response is associated with the original post of the mini-game so as to be presented alongside the mini-game for other users to view and play.

Users responding to the challenge comment from a creating user may all not respond to the comment. Instead, they may simply play the mini-game provided in the post. As a result, some of the mini-game play videos generated in response to the initial mini-game challenge may not include any challenge responses. Irrespective of whether a user provides a challenge response or not, each of the mini-game play videos recording the mini-game play are stored with the post in the mini-game data store/user data store and rendered alongside the mini-game post for other users to view and play.

Figure 5B:
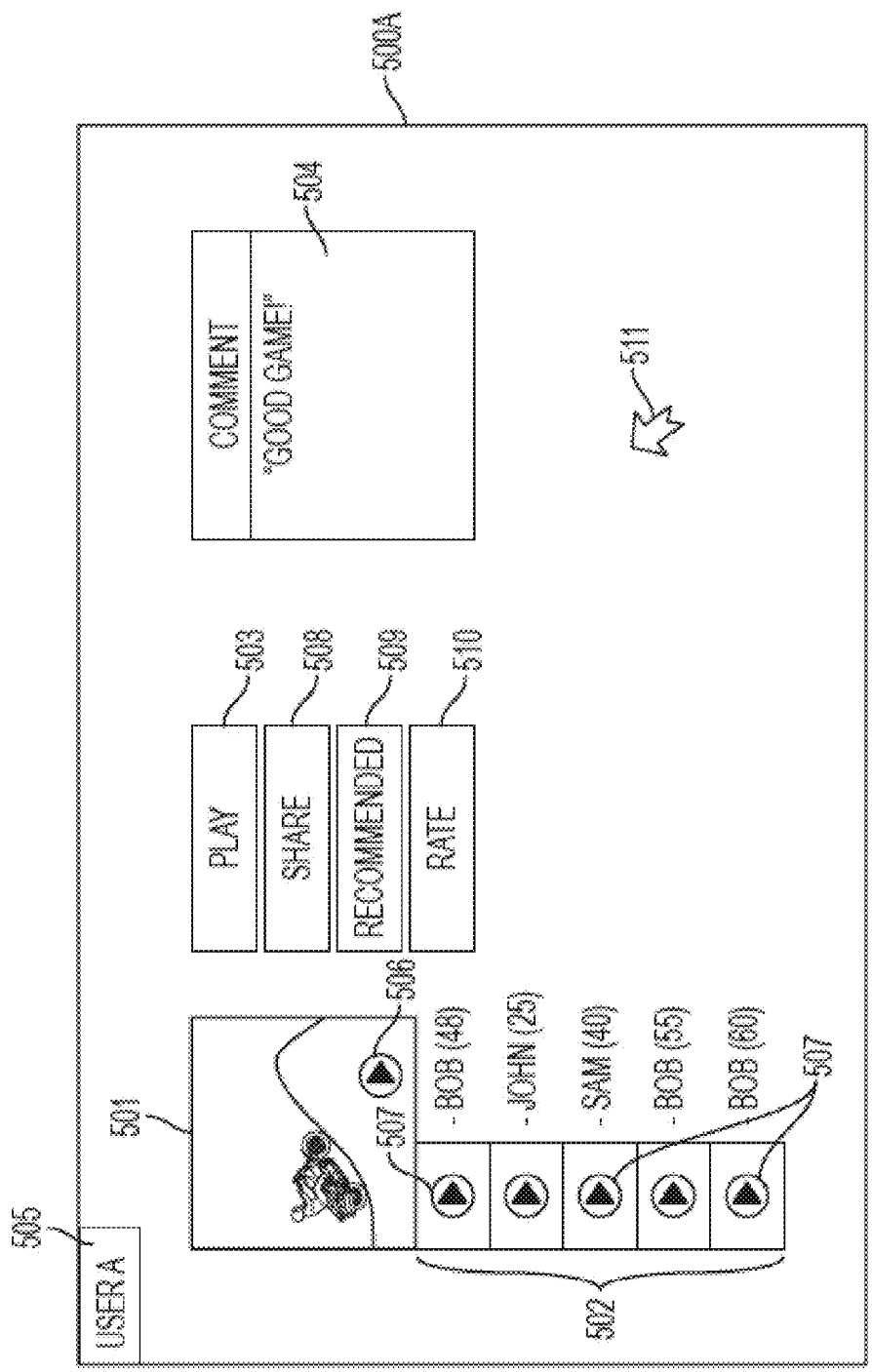
FIG. 5B illustrates a webpage that shows a compact version of mini-game along with available mini-game play videos, in accordance with one embodiment of the present invention.

FIG. 5B illustrates a webpage 500A that shows a shared mini-game 501 along with other related information, in accordance with one embodiment of the present invention. In one embodiment, webpage 500A is a social network webpage of a social network user (e.g., user A), and the social network may be maintained by a social media provider 140 as shown in FIG. 1A. In another embodiment, the webpage 500A is a game network webpage maintained by the game network. In one embodiment, the webpage 500A can be content that is displayed in a newsfeed of a social network. In still another embodiment, the content of the webpage 500A may be rearranged in another form, to fit within a website of the game provider or the cloud gaming network provider.

In this embodiment, webpage 500A shows a shared mini-game 501, associated with five mini-game play videos (MGPVs) 502 (that are created based on the executions (or plays) of mini-game 501 by others), a play button 503 for executing the game code of the shared mini-game 501 with an initial image provided by a video frame that is representative of the content of the mini-game, a comment input window 504 to provide challenge comment, a user identifier window 505 of the user accessing the mini-game that is posted for sharing or creating the mini-game for sharing, a mini-game video view icon 506, five mini-game play video view icons 507 to view the mini-game play videos generated by other users that accepted the challenge, a share button 508 for sharing mini-game 501, e.g., with other users who are network friends of user A, a recommendation button 509 for recommending mini-game 501, a rate icon 510, and a mouse cursor 511.

In one embodiment, user A may simply view the shared mini-game 501 by clicking mini-game view icon 506. In response to the user activity of clicking, the video segment of the mini-game 501 is rendered at a display 132 of the user device 100. During the view of video segment or after the view of the video segment of the mini-game 501, user A may play an executable version of the mini-game 501 by pushing play button 503. If mini-game 501 gets a lot of plays, either due to popularity or by sharing, the mini-game 501 may get a history of plays. The history of plays for mini-game 501 will be represented by the mini-game play video (MGPVs) 502. In this embodiment, the history of plays is rendered in a compact form. In another embodiment, the history may be rendered in an expanded form, as will be described with reference to FIG. 6. In one embodiment, the player and the playing score of a created mini-game play video are shown to the right of the mini-game play video 502. In another embodiment, the player and the challengee counter may be shown to the right of the mini-game play video 502. A user may wish to view the prior plays generated by other users by clicking the corresponding mini-game play video view icon 507.

User A can also share mini-game 501 with his or her social network friends, or recommend mini-game 501 by pushing share button 508 and recommendation button 509, respectively. User comments for mini-game 501 (e.g., "Good Game!") may be entered in comment input window 504. In one embodiment, the user recommendations and sharing, and the user comments entered for mini-game 501, the number of times mini-game 501 is viewed or played, and the number of mini-game play videos 502 created based on the execution of mini-game 501 will be recorded in a mini-game data profile stored in mini-game data store 166 and/or in user data profile stored in game network user store 165 of game cloud system 110, as shown in FIG. 1A.

All or some of the data collected from the sharing, such as plays, sharing with others, sharing on social sites, rate of sharing, number of recommendations, actual ratings, etc., can be used to generate a ranking score. The ranking score can be used to promote the mini-game and encourage additional sharing or play. Games that are higher ranked can earn rewards to the creator and can also provide a higher rating to the user and better status for the user that created the higher ranked mini-games.

In one embodiment, the game manufacturer of the original game title based on which mini-game 501 is created may identify the users who frequently play the shared mini-game 501 and the users who got high play scores, and send target messages, notifications, emails, and/or advertisements to those identified users. In this example, Bob has played the shared mini-game 501 three times with decent scores. Thus, the game manufacturer may send a message to Bob to advertise the original game title and offer purchase discount. Alternatively, if mini-game 501 is a very popular shared mini-game in the cloud, the game manufacture may study the video frames and the actions associated with mini-game 501 and create new games that include video frames and actions similar to the ones in mini-game 501.

Figure 6:
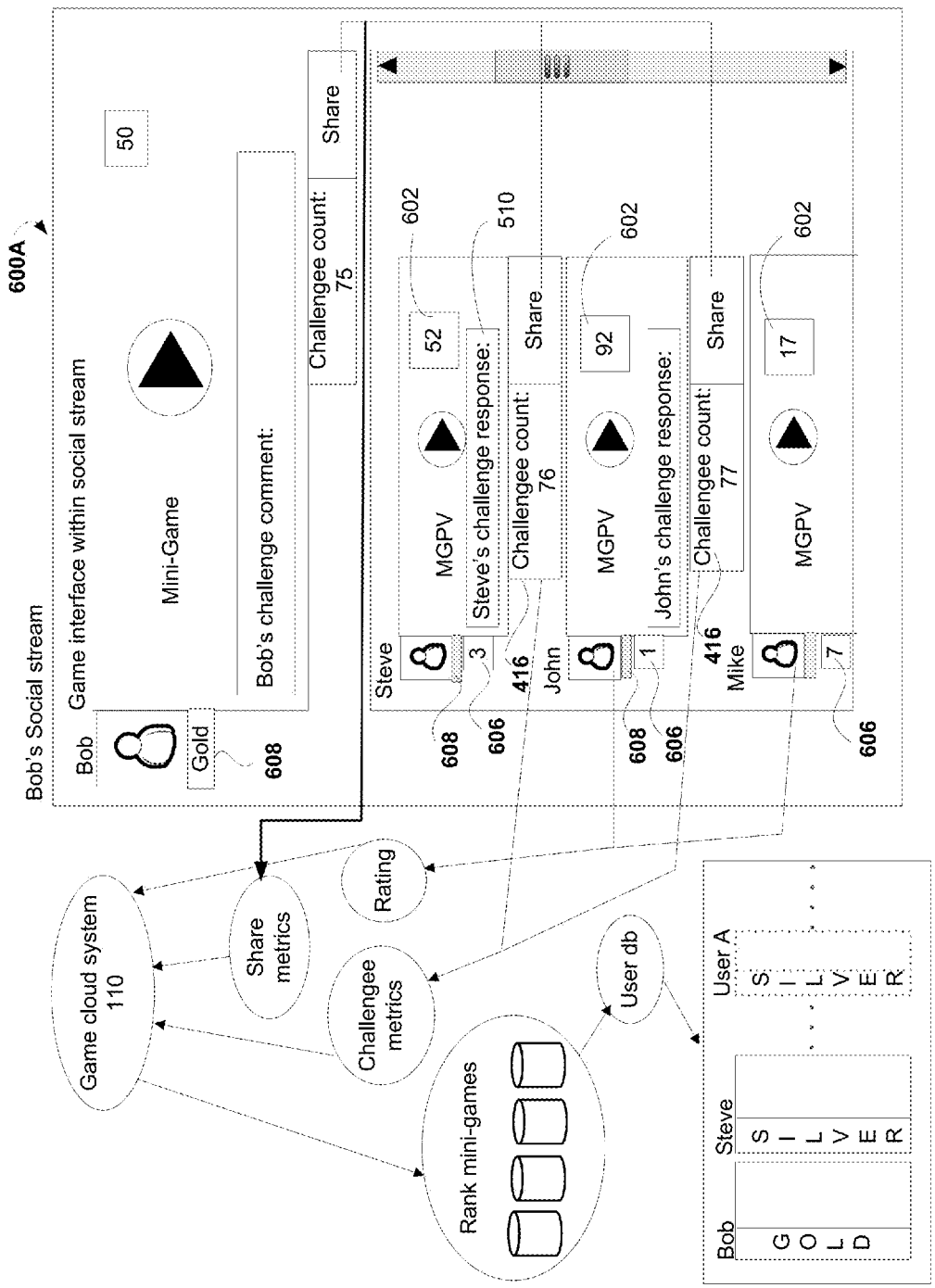
FIG. 6 illustrates the various features of the post and the user/game metrics that are updated at the game cloud system from the posts, in accordance with one embodiment of the invention.

FIG. 6 illustrates a user interface 600A provided with a social stream of a social network from which a network user (for e.g., user Bob) accesses and plays the mini-game, in one embodiment of the invention. As mentioned earlier, the mini-game rendered on the webpage includes a video portion accessed through a mini-game video view icon, an executable portion that is triggered upon user activity, and a challenge portion that is rendered alongside the mini-game in the mini-game post. In addition, a count of the number of viewers that accessed and played the mini-game (i.e., challengee counter) 416, the rating of the mini-game provided by users who played the game 606, status of the users that play the mini-game 608, and challenge responses may also be rendered.

Additionally, the game score 602 achieved during game play of the mini-game may also be posted with the mini-game. The number of users responding to the challenge is accumulated in the challengee counter by a metric accumulator and the same is updated to the mini-game data store and game network data store for computing additional game and/or user metrics. Similarly, number of users sharing the mini-game is accumulated under share metric and the rating information provided by the users are updated to the mini-game data store and game network user data store within the GCS 110. The metric accumulator uses these different metrics to determine additional user metrics, such as the popularity of the user, the relative ranking of the user, the status of the user and additional game metrics, such as the popularity of the mini-games, the ranking of the mini-games, etc.

The game metrics and user metrics are used to rank and order the mini-games when presenting the mini-games in the webpage of the game network or the social network, with higher ranked mini-games and users being presented prominently at the top and lower ranked ones in the bottom. These relative rankings are also used to promote the full games, additional games by game developers and for targeting advertisements and/or promotional media by advertisers or game developers.

The various embodiments provide a way to manage games within a game network by providing access to portions of games to users to generate interest in the game and to encourage the users to play the portions of the games and get engaged. By providing access to mini-games, users are given a preview of the various content of the game leading to the users potentially buying the game. The mini-games give a view to the content and challenges of the game without overwhelming the users with a full blown game. Additionally, by making the games more interactive and by allowing the users to generate their own mini-games for sharing with other users, the game developers/owners make it interesting for the users and keep the users more engaged. Other advantages will become apparent to one skilled in the art.

Figure 7:
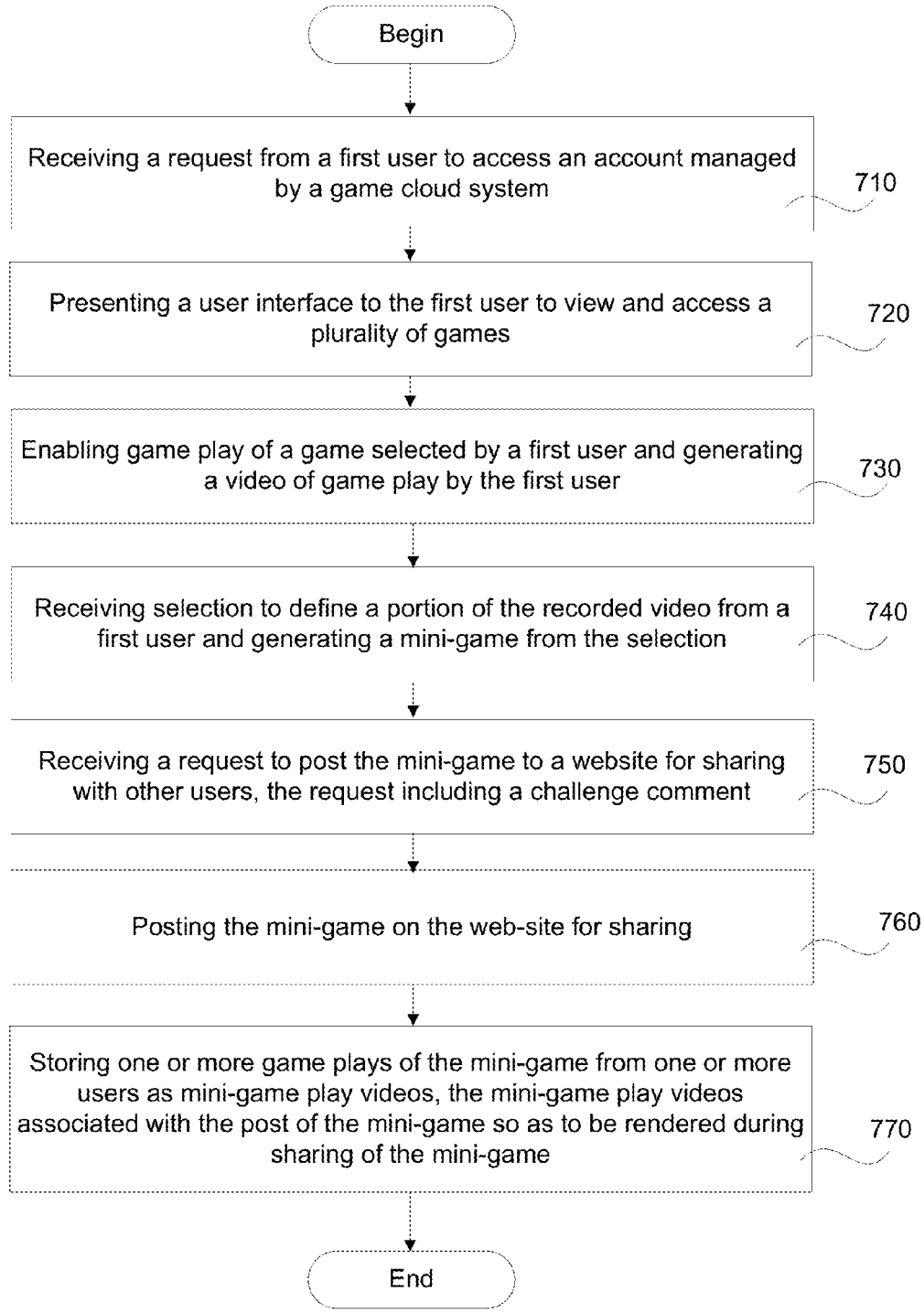
FIG. 7 is a flow chart illustrating an exemplary method for managing execution and sharing of mini-games over a game cloud system, in accordance with one embodiment of the present invention.

FIG. 7 is a flow chart illustrating an exemplary method 700 for managing execution and sharing of mini-games over a game cloud system, in accordance with one embodiment of the present invention. In one embodiment, the illustrated exemplary method 700 is described in relation to operations performed by game cloud system 110 as shown in FIGS. 1A and 1B.

At operation 710, a request is received from a first user to access an account managed by the game cloud system. The user access may be in the form of a user authentication module that authenticates a user before access to the user account can be provided to the user. In response to successful authentication of the user, a plurality of games that are stored in a cloud is provided in a user interface, as illustrated in operation 720. The games that are provided are the ones that are available for the user account. Game play of any one of the games presented in the user interface is enabled and a video is generated capturing a recording of user activities associated with a game play for a first game selected by a first user, as illustrated in operation 730. The recorded game play is for the full game played by the first user.

During the game play or after the game play, a selection of a portion of the recorded video is received from the first user, as illustrated in operation 740. The selection causes a game processor module executing on the game cloud system to generate a mini-game. The mini-game generated by the game processor module includes a recorded video for the portion of the game defined within the mini-game and an executable portion for the mini-game. In one embodiment, control information provided within the user interface will enable the first user to define a starting frame and an ending frame of the video to define the portion of the mini-game and the game processor module uses the frame pointer to identify the executable code that encompasses the portion of the mini-game.

A request to share the mini-game is received from the first user, as illustrated in operation 750. The request to share may be provided through user activity at a share option or a post option provided at the user interface. The share request received at the game processor module causes the game processor module to post the mini-game to a website to enable other users to view the portion of the recorded video and play the executable portion of the mini-game. The request also includes a challenge comment that is to be posted along with the mini-game to the website. The challenge comment is provided by the first user.

In response to the request, the game processor posts the mini-game along with the challenge comment to the website, as illustrated in operation 760. The mini-game with the challenge comment may be posted to one or more social networks associated with the first user in a social stream or newsfeed to enable the friends and social contacts of the first user to accept the challenge and play the mini-game. Alternately or in addition to posting to the social network, the mini-game with the challenge comment may be posted to the game network for users of the game network to view the video and play the mini-game.

One or more game plays from different users that access the mini-game posted on the website are received and stored as mini-game play videos in the game system, as illustrated in operation 770. The stored mini-game play videos may include response comments for the challenge comment. The stored mini-game play videos are associated with the original post of the mini-game so that when other users access the mini-game posted on the website, the recorded video of the mini-game and the one or more mini-game play videos are rendered alongside the mini-game post. In addition to the recorded video and mini-game play videos, challenge comment and any response comments may also be stored with the mini-game and rendered alongside the mini-game for other users to view. The mini-game play videos may be accessed by any user playing the mini-game.

In one embodiment, the game cloud system is configured to detect the type of client device associated with the user, and also a type of controller available for the user to provide input to the cloud-based video game. For example, in one embodiment, when a user logs in to the game cloud system, they may be presented with an option to designate the type of client device with which they are accessing the game cloud system. In one embodiment, a series of client device options are presented from which the user may select one corresponding to their client device. The user may also be presented with an option to designate the type of controller device they will use to play a video game. In one embodiment, a series of controller options can be presented to the user, from which the user may select to designate a controller type corresponding to their controller hardware. In other embodiments, the game cloud system can be configured to automatically detect the client device type and/or the controller device type.

For example, at the time of login, the client device may send information to the cloud gaming server identifying itself as well as a connected controller device (e.g. in response to a request from the cloud gaming server). Based on this information, the game cloud server may determine an appropriate video game output configuration and input parameter configuration to provide a gaming experience optimized for the user's client device and controller device. In one embodiment, a look-up table is employed to determine video game configuration and input parameter configuration based on a detected client device and a detected controller device.

It should be appreciated that a given video game may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g. accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g. accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g. feedback data) from the client device or directly from the cloud gaming server.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A controller, comprising,
a circuit;
a plurality of input controls being interfaced with the circuit of the controller for producing controller data;
a communication circuit for connecting the controller with an internet access device, the communication circuit configured to exchange controller data with a game server through the internet access device, the exchange of controller data occurring without a communication link being established between the controller and a local game console or without requiring the controller data to pass through the local game console, and the game server is configured to execute a game play of a video game and drive interactivity of the video game using the controller data, the game server being remote from the local game console, wherein the game server transmits a video feed of the game play to the local game console for rendering on a display associated with the local game console; and
a motion detection hardware coupled to the circuit of the controller to provide motion detection input for the controller, the motion detection input included with the controller data that is exchanged with the game server through the internet access device, and used to drive the interactivity of the video game.

2. The controller of claim 1, wherein the controller data produced by the input controls include button inputs, joystick inputs, embedded motion detection inputs, audio inputs, or any two or more combinations thereof.

3. The controller of claim 1, wherein the internet access device is communicatively connected to the game server over a network.

4. The controller of claim 1, further includes feedback circuitry to receive feedback provided by the game server.

5. The controller of claim 1, wherein the controller is connected to the internet access device through a wireless connection.

6. The controller of claim 1, further generates a second type of controller data that is configured to pass through the local game console, wherein a processor in the local game console is configured to process the second type of controller data, communicatively connect to the internet access device to transmit the second type of controller data to the game server, receive the video feed, process the video feed and render the video feed on a display of the local game console.

7. A controller, comprising:
logic for connecting the controller to an internet access device, the controller configured to exchange controller data to and from a game server via the internet access device, without communicating with a game console, the controller data being configured to control interfacing with a game interface and games provided via the game server, the game server configured to receive the controller data and drive interactivity of a game selected for execution on the game server, wherein a video feed of game play is transmitted by the game server to a display of the game console for rendering; and
feedback circuitry to receive feedback data provided by the game server.

8. The controller of claim 7, wherein the controller data directs a state of the video feed provided at the display, in response to communication of the controller data to the game server via the internet access device.

9. The controller of claim 7, wherein the controller is communicatively connected to the internet access device through a wireless connection.

10. The controller of claim 7, wherein the controller includes a motion detection hardware to provide motion detection input for the controller, the motion detection input included with the controller input data that is exchanged directly with the game server through the internet access device, and used for driving interactivity in the game.

11. The controller of claim 7, wherein a processor in the game console is configured to communicatively connect to the internet access device to receive the video feed, process the video feed and render the video feed on a display of the game console.

12. A method for providing inputs to a game executing on a game server, comprising:
exchanging controller data for the game executing on the game server via an internet access device, the controller data acting to drive interactivity of the game executing on the game server, the exchange of controller data between the game server and a controller occurring without going through a local game console, the game server configured to execute the game play of the game and transmit a video feed of the game play to the local game console for rendering, wherein the controller data directs a state of the video feed rendered at the display in response to communication with the game server via the internet access device; and
receiving feedback data from the game server, the exchange of the feedback data between the game server and the controller occurring via the internet access device, without going through the local game console or without requiring a communication link to be established between the local game console and the controller, the controller configured to process the feedback data to generate output at the controller.

* * * * *